United States Patent
Sekii et al.

(10) Patent No.: US 8,144,423 B2
(45) Date of Patent: Mar. 27, 2012

(54) FLUID DYNAMIC PRESSURE BEARING DEVICE, SPINDLE MOTOR AND DISK DRIVE APPARATUS

(75) Inventors: Yoichi Sekii, Kyoto (JP); Hironao Sasaki, Kyoto (JP)

(73) Assignee: Nidec Corporation, Kyoto (JP)

( * ) Notice: Subject to any disclaimer, the term of this patent is extended or adjusted under 35 U.S.C. 154(b) by 504 days.

(21) Appl. No.: 12/400,884

(22) Filed: Mar. 10, 2009

(65) Prior Publication Data

US 2009/0231754 A1 Sep. 17, 2009

(30) Foreign Application Priority Data

Mar. 11, 2008 (JP) .................................. 2008-060769

(51) Int. Cl.
*G11B 17/02* (2006.01)
*F16C 32/06* (2006.01)

(52) U.S. Cl. ...................... 360/99.08; 384/114; 384/119; 384/132; G9B/17.002

(58) Field of Classification Search .................. None
See application file for complete search history.

(56) References Cited

U.S. PATENT DOCUMENTS

| | | | |
|---|---|---|---|
| 5,457,588 A | 10/1995 | Hattori et al. | |
| 5,533,811 A | 7/1996 | Polch et al. | |
| 5,806,987 A | 9/1998 | Nose et al. | |
| 6,456,458 B1 | 9/2002 | Ichiyama | |
| 7,281,852 B2 | 10/2007 | Woldemar et al. | |
| 7,654,742 B2 | 2/2010 | Nishimoto et al. | |
| 7,758,246 B2 * | 7/2010 | Aiello et al. | 384/107 |
| 2003/0030222 A1 | 2/2003 | Grantz et al. | |
| 2004/0165797 A1* | 8/2004 | Oku et al. | 384/119 |
| 2004/0240104 A1 | 12/2004 | Francuski et al. | |
| 2006/0051001 A1 | 3/2006 | Nishimura et al. | |
| 2006/0255673 A1* | 11/2006 | Sekii | 310/90 |
| 2008/0056104 A1 | 3/2008 | Nishimura et al. | |

FOREIGN PATENT DOCUMENTS

| | | |
|---|---|---|
| JP | 2000-245104 A | 9/2000 |
| JP | 2000-354349 A | 12/2000 |
| JP | 2002-005171 A | 1/2002 |
| JP | 2004-286145 A | 10/2004 |
| JP | 2004-350494 A | 12/2004 |
| JP | 2005-048890 A | 2/2005 |
| JP | 2005-291452 A | 10/2005 |
| JP | 2006-158015 A | 6/2006 |
| JP | 2007-162759 A | 6/2007 |
| JP | 2007-327528 A | 12/2007 |

OTHER PUBLICATIONS

Iguchi et al., "Method of Manufacturing Spindle Motor, and Spindle Motor", U.S. Appl. No. 12/277,328, filed Nov. 25, 2008.

* cited by examiner

*Primary Examiner* — Huan Hoang
*Assistant Examiner* — James G Norman
(74) *Attorney, Agent, or Firm* — Keating & Bennett, LLP

(57) ABSTRACT

A fluid dynamic pressure bearing device includes a shaft, an annular member, and a rotating member. The annular member is fixed to or seamlessly defined with the shaft and is radially opposed to the rotating member. The annular member and the rotating member are covered with a seal member. A first gap is defined between the seal member and the annular member. A second gap is defined between the rotating member and the seal member. A third gap is defined between the annular member and the rotating member. The first gap preferably has a width smaller than that of the second gap but greater than that of the third gap.

20 Claims, 20 Drawing Sheets

FLUID DYNAMIC PRESSURE BEARING DEVICE, SPINDLE MOTOR AND DISK DRIVE APPARATUS

BACKGROUND OF THE INVENTION

1. Field of the Invention

The present invention relates to a fluid dynamic pressure bearing device, a spindle motor provided with the bearing device and a disk drive apparatus provided with the spindle motor.

2. Description of the Related Art

In recent years, a storage disk drive apparatus has been used in a personal computer, a car navigation and so forth. The storage disk drive apparatus is required to have increased density while also being small-sized, low-profile and light-weight. Demands for a high rotation number and a highly accurate rotational operation exist in a spindle motor used in rotating disks.

A conventional fluid dynamic pressure bearing device includes a conical dynamic pressure bearing unit for radially and axially supporting a shaft or a sleeve. As the shaft and the sleeve rotation relative to one another, a fluid dynamic pressure is generated in the lubricating fluid filled in a minute gap by the pumping action of dynamic pressure groove arrays of the conical dynamic pressure bearing unit. The shaft or the sleeve is radially and axially supported by the fluid dynamic pressure thus generated.

However, with the conventional dynamic pressure bearing device it is sometimes the case that a strong impact caused by external factors is applied to the fluid dynamic pressure bearing device in a tapering seal portion formed between the outer circumferential surface of an annular member and the inner circumferential surface of a seal member (or the inner circumferential surface of a rotating member such as a hub or the like in case of not employing the seal member). At this time, the width of a minute gap between the radial outermost portion of the annular member in a cross-section containing a center axis and the inner circumferential surface of the seal member (or the inner circumferential surface of the rotating member) becomes momentarily zero. As a result, the annular member and the seal member (or the rotating member) make contact with each other in the zero-width region. The lubricating fluid held in the tapering seal portion then momentarily leaks out from the zero-width region.

SUMMARY OF THE INVENTION

In order to overcome the problems described above, a fluid dynamic pressure bearing device in accordance with a preferred embodiment of the present invention preferably includes a shaft, an annular member and a rotating member. The annular member is fixed to or seamlessly arranged with the shaft and radially opposed to the rotating member. The annular member and the rotating member are also covered with a seal member.

A first minute gap is defined between the seal member and the annular member. A second minute gap is defined between the rotating member and the seal member. A third minute gap is defined between the annular member and the rotating member. The first minute gap has a width smaller than that of the second minute gap but greater than that of the third minute gap.

A fluid dynamic pressure bearing device in accordance with another preferred embodiment of the present invention preferably includes a shaft, an annular member and a rotating member. A first minute gap is defined between the outer circumference of the annular member and the inner circumference of the rotating member. Second and third minute gaps are defined between the end surface of the annular member and the rotating member. The width of the first minute gap between a radial outermost portion of the outer circumferential surface of the annular member and the inner circumferential surface of the rotating member is set to be smaller than the width of the second minute gap but greater than the width of the third minute gap.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

In the following description, the side on which a rotor unit 4 lies along a central axis L will be referred to as "upper" and the side on which a stator unit 3 lies along the central axis L will be called "lower". However, these terms are not intended to limit the installation postures of a fluid dynamic pressure bearing device, a spindle motor and a disk drive apparatus of the present invention.

Figure 1:
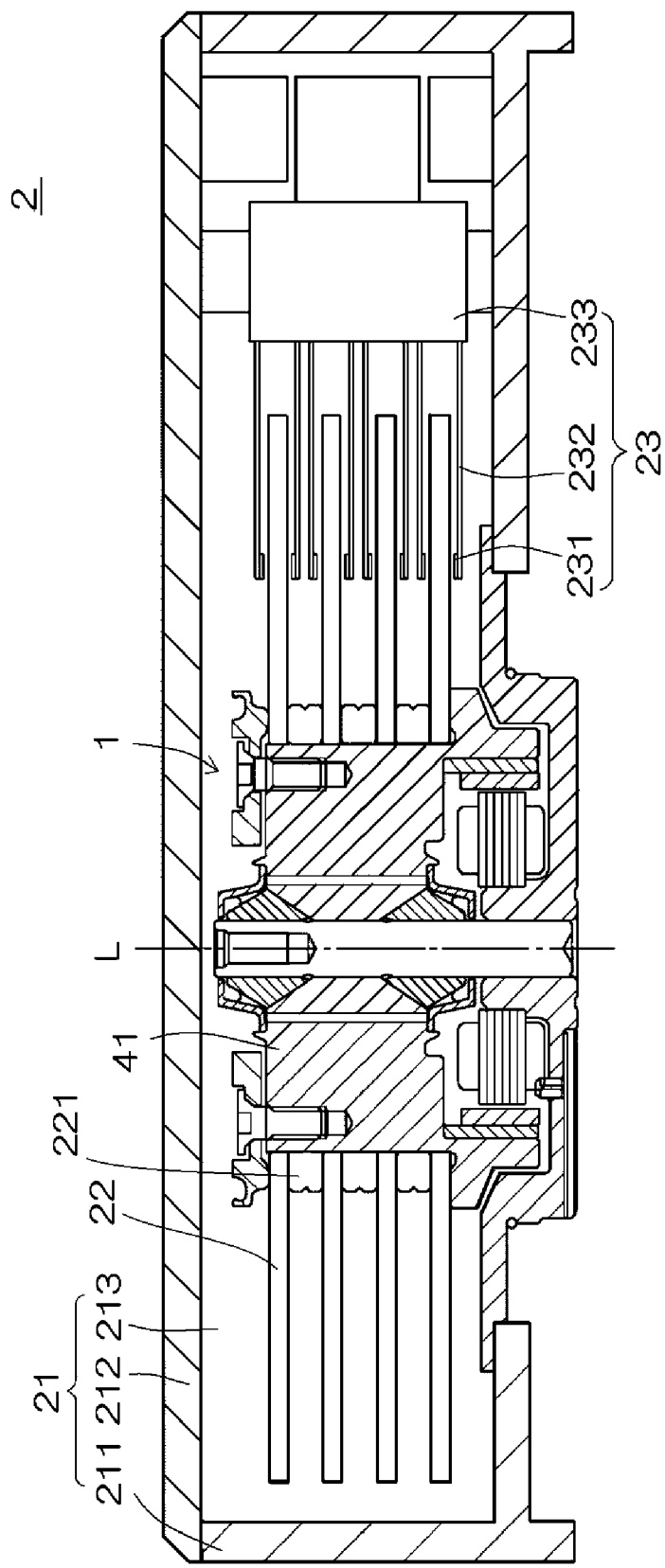
FIG. 1 is a vertical section view showing a disk drive apparatus.

FIG. 1 is a vertical section view showing a disk drive apparatus 2 provided with a spindle motor 1 in accordance with a first preferred embodiment. The disk drive apparatus 2 is a hard disk drive that reads and writes information from and on a plurality of (e.g., four) magnetic disks 22 while rotating the magnetic disks 22.

As shown in FIG. 1, the disk drive apparatus 2 preferably includes an apparatus housing 21, storage disks (hereinafter simply referred to as "disks") 22 such as, for example, magnetic disks or optical disks, an access unit 23 and a spindle motor 1.

The apparatus housing 21 preferably includes a substantially cup-shaped first housing member 211 and a substantially flat shaped second housing member 212. The first housing member 211 preferably has an upper opening. The spindle motor 1 and the access unit 23 are preferably installed on the inner bottom surface of the first housing member 211.

The second housing member 212 is preferably connected to the first housing member 211 so as to cover the upper opening of the first housing member 211. The first housing member 211 and the second housing member 212 define a clean internal space 213 in which dust is rare. The disks 22, the access unit 23 and the spindle motor 1 are preferably accommodated within the internal space 213.

The disks 22 are preferably disk-shaped data storage media each having a central aperture. The disks 22 are preferably mounted to a rotating member 41 of the spindle motor 1 and arranged one above the other in a mutually parallel and equally spaced-apart relationship, with a spacer 221 interposed therebetween.

The access unit 23 preferably includes a plurality of (e.g., eight) heads 231 opposing the upper and lower surfaces of the disks 22, arms 232 arranged to support the respective heads 231 and a swing mechanism 233 arranged to swinging the arms 232.

The access unit 23 is preferably designed to swing the arms 232 cross the disks 22 with the swing mechanism 233, thereby allowing the heads 231 to gain access to desired positions on the disks 22. Thus the heads 231 preferably perform the tasks of reading and writing information from and on the recording surfaces of the disks 22 under rotation. It may be possible for the heads 231 to perform only one of the reading and writing tasks.

Figure 2:
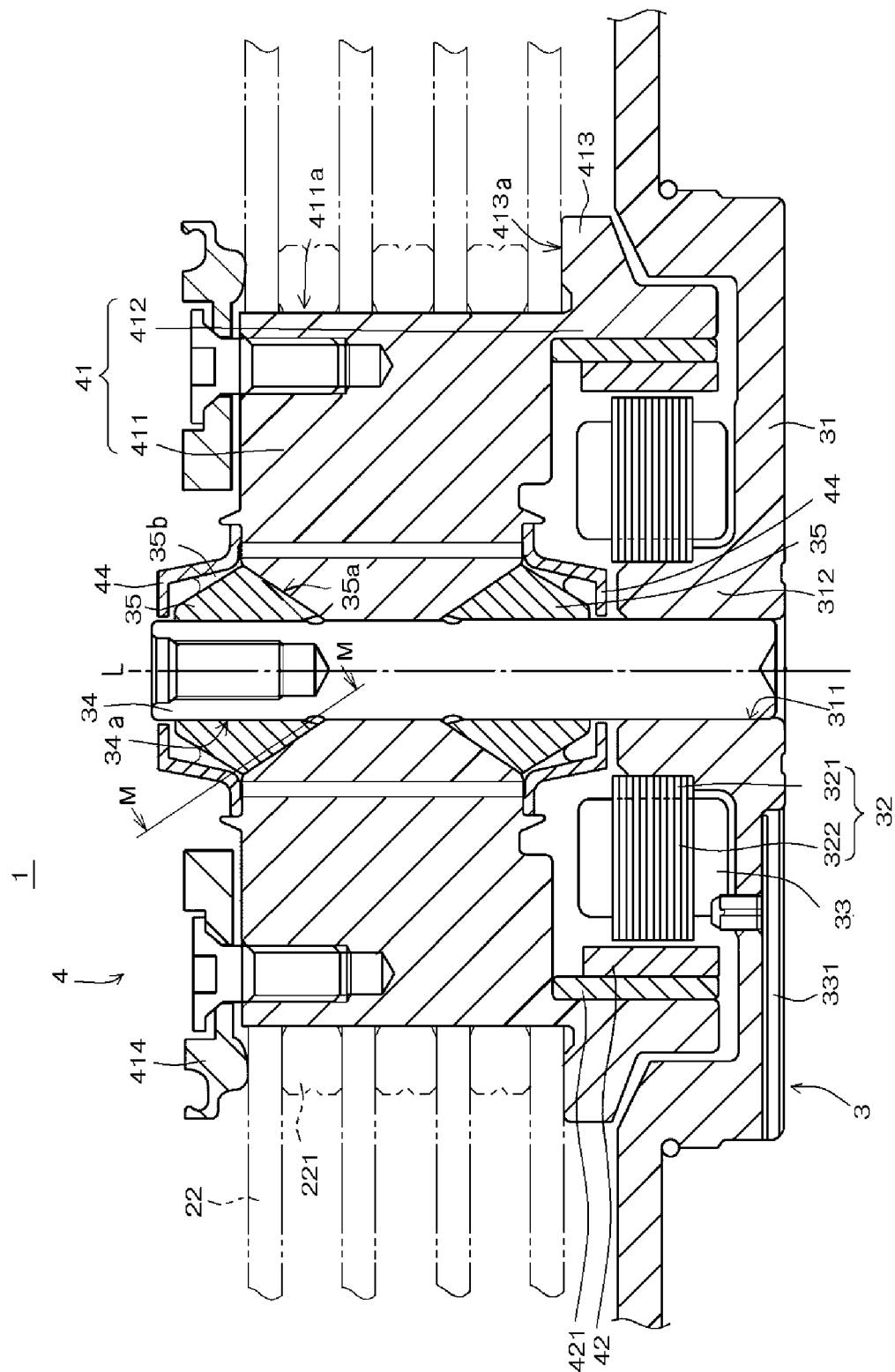
FIG. 2 is a vertical section view showing a spindle motor.

FIG. 2 is a vertical section view showing the spindle motor 1. Preferably, the spindle motor 1 includes a stator unit 3 fixed to the apparatus housing 21 and a rotor unit 4 which holds the disks 22 and rotates about a specified central axis L.

The stator unit 3 preferably includes a base member 31, a stator core 32, coils 33, a shaft 34 and annular members 35.

The base member 31 is preferably made of, e.g., a metallic material such as aluminum or the like and is fixed to the apparatus housing 21 by screws or other fixing devices. A substantially cylindrical holder portion 312 protruding in the axial direction (in the direction extending along the central axis L) is preferably defined in the central region of the base member 31. A through-hole 311 extending through the base member 31 along the central axis L is preferably defined in the holder portion 311. Although the base member 31 and the first housing member 211 are preferably defined as separate members in the present preferred embodiment, the base member 31 and the first housing member 211 may be seamlessly defined by a single member.

The stator core 32 is formed by, e.g., axially laminating electromagnetic steel plates in plural layers and, preferably, includes a core-back 321 and a plurality of tooth portions 322. The core-back 321 has a substantially annular shape and is fitted to the outer circumferential surface of the holder portion 312. The tooth portions 322 protrude radially outwards (in the direction perpendicular or substantially perpendicular to the central axis L, which definition holds true herein below) from the core-back 321.

The coils 33 are defined by a conductive wire wound around the respective tooth portions 322. The coils 33 are connected to an external power source device (not shown) via a connector 331. If a driving current is supplied from the power source device to the coils 33 through the connector 331, the magnetic flux generated from the tooth portions 322 interacts with the magnetic flux of a rotor magnet 42 to generate torque that rotates the rotor unit 4 about the central axis L.

The shaft 34 is a substantially columnar member and is fixed to the base member 31 with its lower end portion inserted into the through-hole 311.

The annular members 35 protrude radially outwards from the central axis L and are fixed to the upper and lower extensions of the shaft 34, respectively, in a symmetrical relationship with each other. The annular members 35 are preferably made of, e.g., a metallic material close in linear expansion coefficient to the rotating member 41 (such as an alloy mainly composed of aluminum or copper) or a resin material. Alternatively, the annular members 35 and the shaft 34 may be seamlessly defined by a single body.

The method of fixing the annular members 35 and the shaft 34 together is not particularly limited. It may be possible to fix a single annular member 35 to one of the upper and lower extensions of the shaft 34.

The present preferred embodiment will now be described with reference to the annular member 35 fixed to the upper extension of the shaft 34. In this preferred embodiment, the dynamic pressure bearing unit preferably has a conical structure as shown in FIG. 2. The annular member 35 preferably has a substantially conical shape. The upper portion of an outer circumferential surface of the annular member 35 is defined by an upper conical surface whose diameter gradually decreases is it moves upwards. The lower portion thereof is defined by a lower conical surface whose diameter gradually decreases downwards.

In the dynamic pressure bearing unit having a conical structure, the lower conical surface of the annular member 35 will be referred to as "lower surface 35a" and the upper conical surface of the annular member 35 will be referred to as "outer circumferential surface 35b" herein below.

As shown in FIG. 2, the rotor unit 4 preferably includes a rotating member 41, a rotor magnet 42 and a seal member 44.

The rotating member 41 is shaped to extend radially outwards around the central axis L. Preferably, the rotating member 41 has a first inner circumferential surface 41a (see FIG. 4) opposing the outer circumferential surface 34a of the shaft 34 through a minute gap, a body portion 411 extending radially outwards and a cylinder portion 412 extending downwardly from the outer peripheral edge of the body portion 411.

The body portion 411 has a radial inner end arranged between the annular members 35 lying one above the other along the axial direction. The radial inner end of body portion 411 is rotatably supported by the outer circumferential surface 34a of the shaft 34, the lower surface 35a of the upper one of the annular members 35 and the upper surface of the lower one of the annular members 35.

The body portion 411 has an outer circumferential surface 411a as a contact surface making contact with the inner circumferential portions (the inner circumferential surfaces or inner peripheral edges) of the disks 22. The cylinder portion 412 is provided with a radially outwardly protruding rest portion 413 having a flange surface 413a on which to support the disks 22.

The four disks 22 are arranged on and above the flange surface 413a in a horizontal posture and at an equal interval. Specifically, the lowermost one of disks 22 is placed on the flange surface 413a and the remaining three disks 22 are placed one by one above the lowermost disk 22, with spacers 221 interposed therebetween. The uppermost one of the disks 22 is pressed and fixed in place by a pressing member 414 attached to the body portion 411.

The inner circumferential portions of the disks 22 remain in contact with the outer circumferential surface 411a of the body portion 411, which restrains the disks 22 from making radial movement. As the rotor unit 4 rotates, the disks 22 are rotated together with the rotating member 41.

In this preferred embodiment, the disks 22 and the rotating member 41 are all primarily made of aluminum. Thus the disks 22 and the rotating member 41 have the same or similar linear expansion coefficient. Even when the temperature is changed, there is no possibility that an excessive stress is generated between the disks 22 and the rotating member 41. No particular limitation is imposed on the material of which the disks 22 and the rotating member 41 are made.

The rotor magnet 42 has a substantially annular shape and is attached to the lower surface of the body portion 411 through a yoke 421. The inner circumferential surface of the rotor magnet 42 serves as a magnetic pole surface and opposes the outer surfaces of the tooth portions 322.

Figure 3:
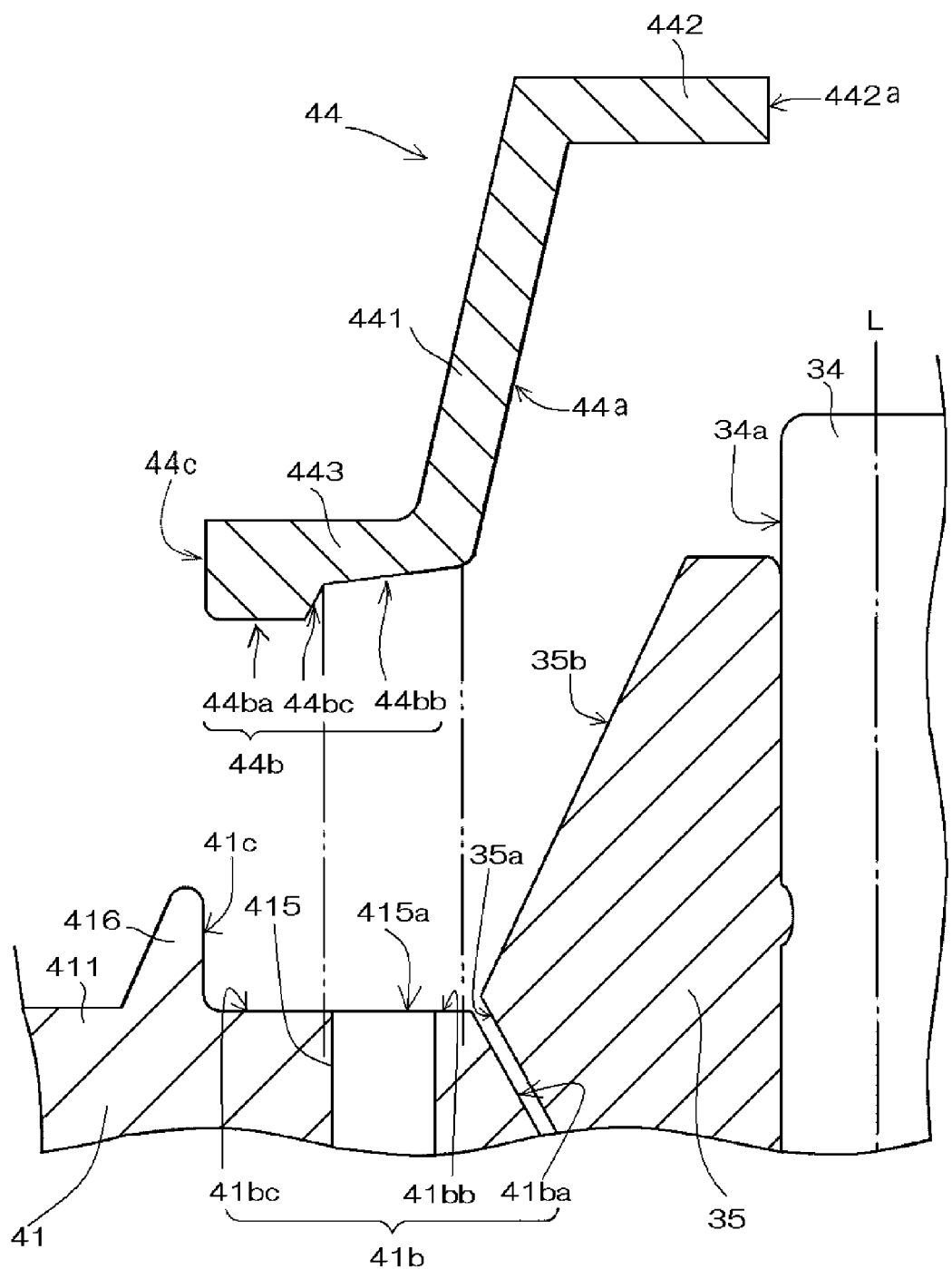
FIG. 3 is a partially exploded vertical section view showing an annular member and its vicinities.
Figure 4:
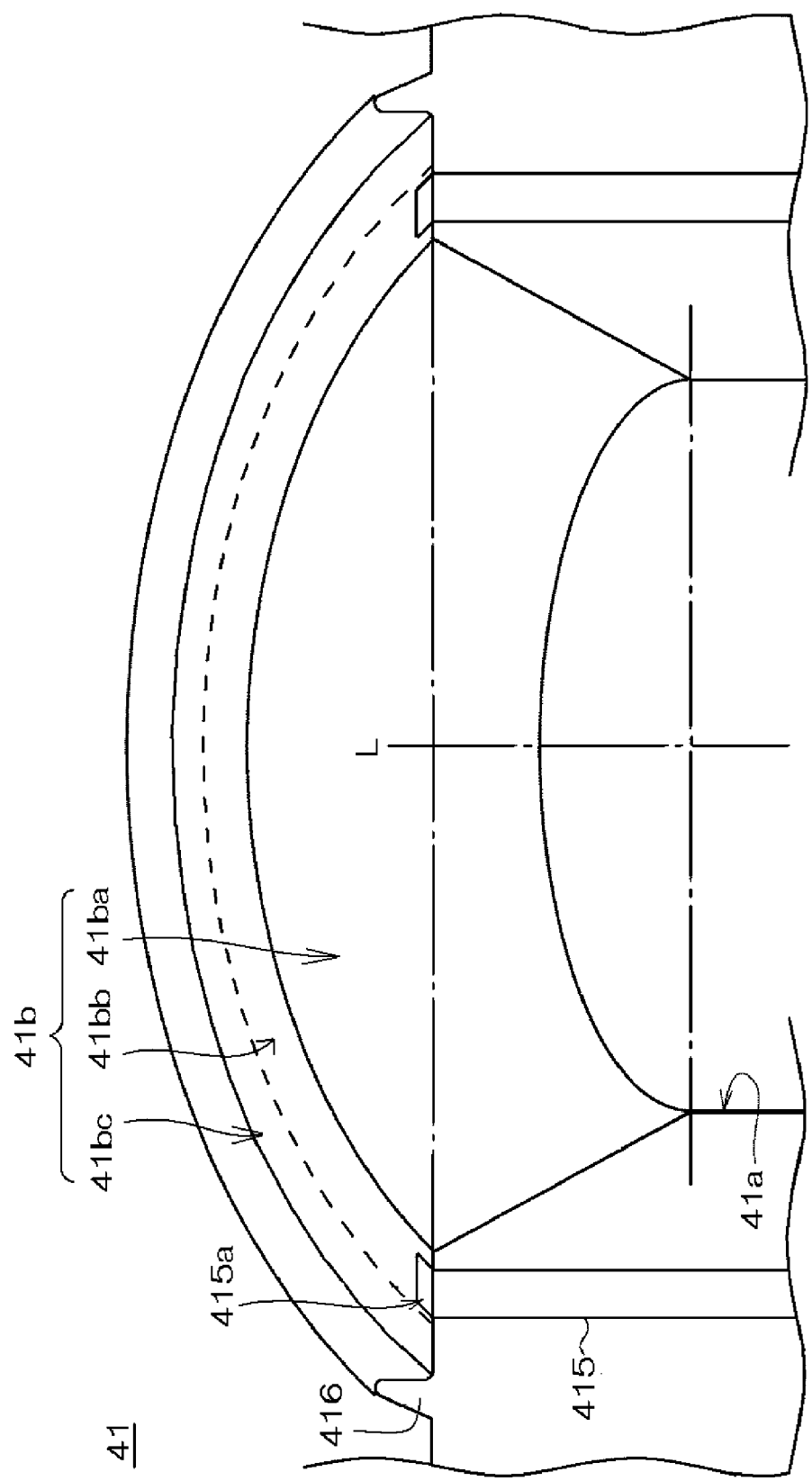
FIG. 4 is a perspective section view of a rotating member taken along line M-M in FIG. 2.
Figure 5:
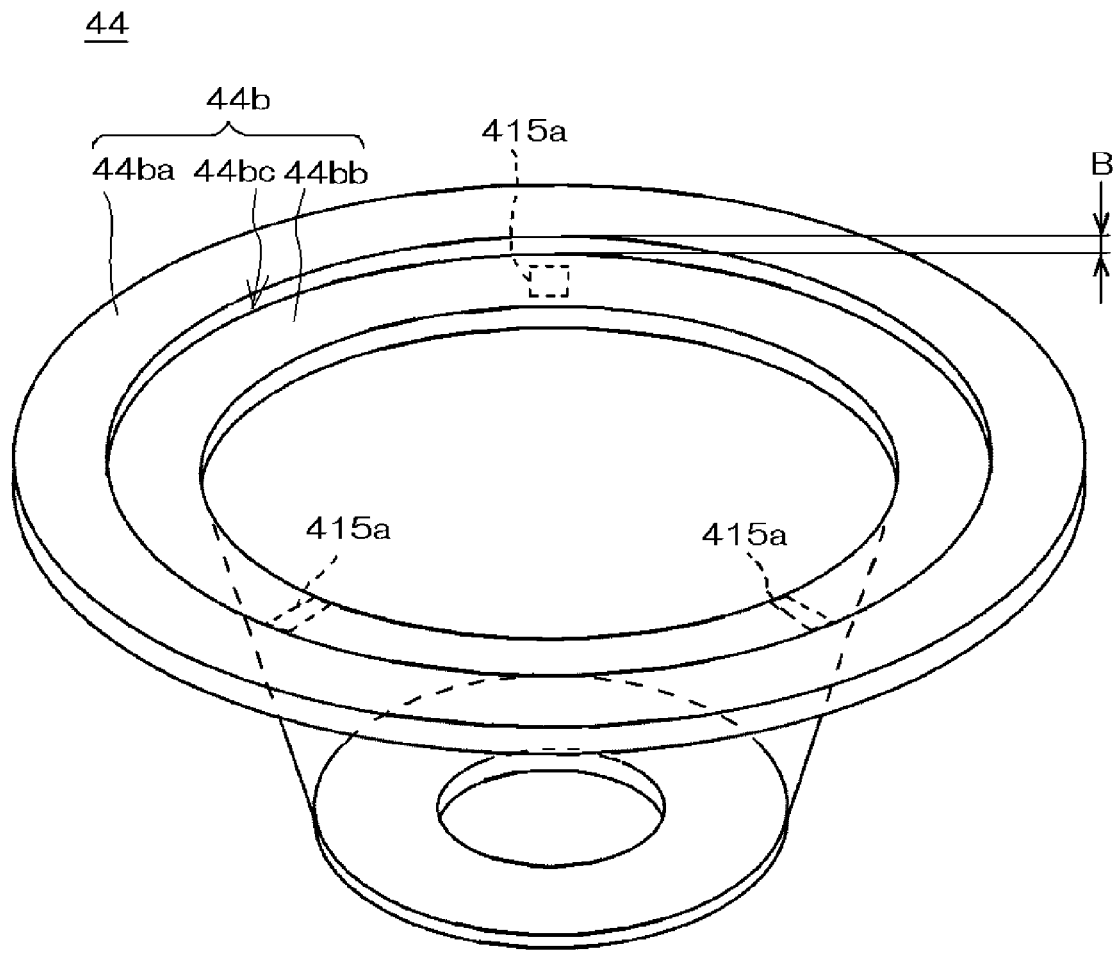
FIG. 5 is a rear perspective view showing a seal member in accordance with a first preferred embodiment of the present invention.

FIG. 3 is an exploded vertical section view of the annular member 35 and elements adjacent thereto, showing the relationship between the rotating member 41 and the seal member 44. FIG. 4 is a perspective section view of the rotating member 41 taken along line M-M in FIG. 2. FIG. 5 is a perspective view of the seal member 44 as seen from the side of a fixed portion 443 thereof.

As shown in FIG. 2, the seal member 44 is attached to the upper surface of the body portion 411 and is used, e.g., to prevent a lubricating fluid 5 from being leaked out of the motor 1.

Figure 6:
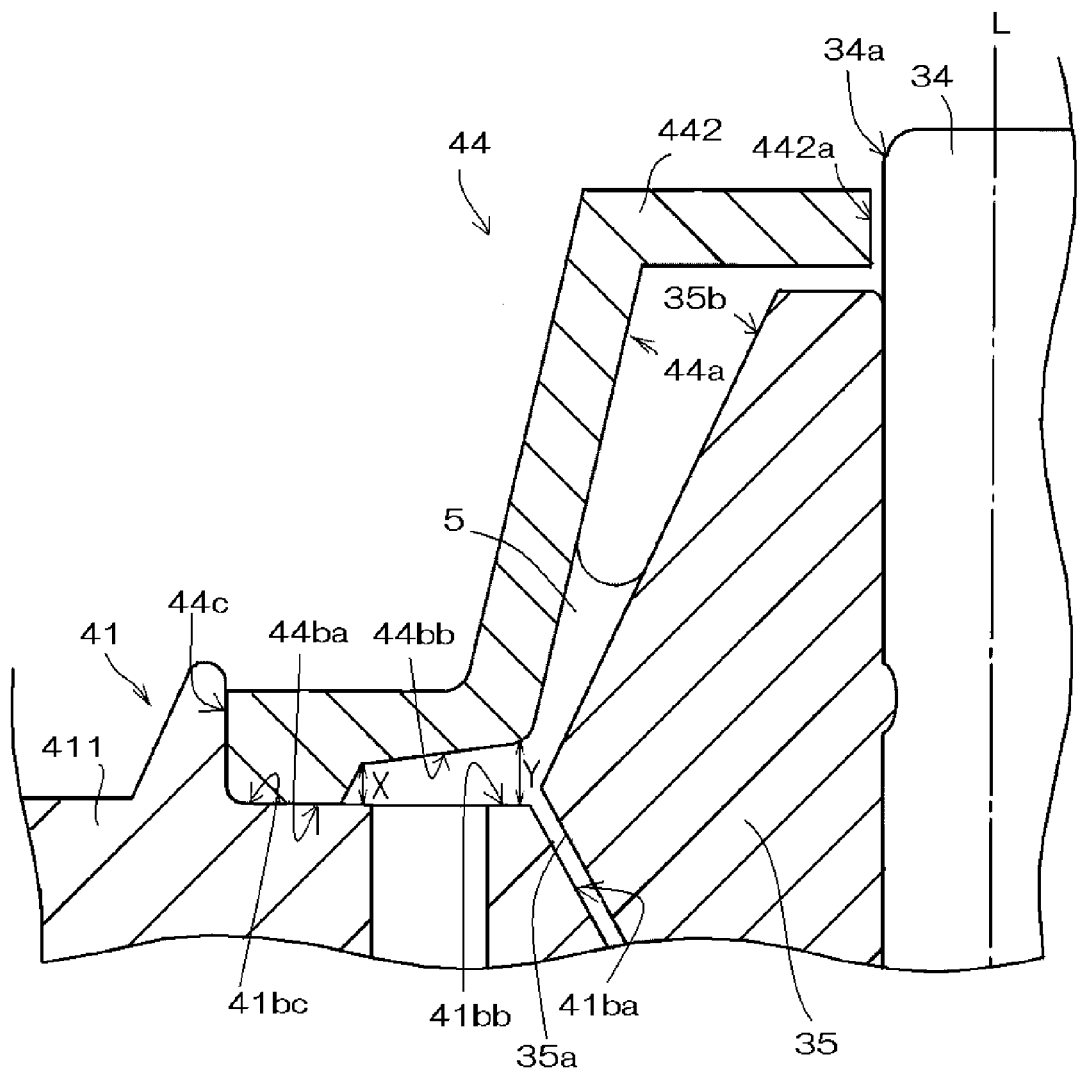
FIG. 6 is an enlarged vertical section view showing a seal member whose second end surface is defined by a slanting surface.

Referring to FIGS. 3, 4 and 6, the rotating member 41 includes an end surface portion 41b having a first end surface 41ba, a second end surface 41bb and a third end surface 41bc arranged from the radial inner side to the radial outer side.

The first end surface 41ba opposes the lower surface 35a of the annular member 35 in a spaced-apart relationship and defines a portion of the end surface portion 41b. As will be set forth later, a dynamic pressure bearing is defined between the first end surface 41ba and the lower surface 35a of the annular member 35.

As can be seen in FIG. 3, the second end surface 41bb is perpendicular or substantially perpendicular to the outer circumferential surface 34a of the shaft 34. The region of the end surface portion 41b lying radially between two axially-extending double-dotted chain lines is opposed to a second end surface 44bb of the seal member 44 in a spaced-apart relationship.

Referring to FIGS. 3 and 4, the third end surface 41bc is provided radially outwards of the second end surface 41bb in a region adjacent to the latter and is coplanar with the second end surface 41bb.

The rotating member 41 includes a protrusion 416 protruding axially upwards from the radial outer edge of the third end surface 41bc. The protrusion 416 has a second inner circumferential surface 41c.

The rotating member 41 has a plurality of (e.g., three) communication holes 415 axially extending from the upper end surface to the lower end surface thereof and arranged at an equal interval in the circumferential direction. Each of the communication holes 415 has an opening 415a adjoining to the second end surface 41bb and opposing the second end surface 44bb of the seal member 44. The number of the communication holes 415 is not particularly limited and may be one or more.

In case the dynamic pressure bearing unit has a conical structure, the first end surface 41ba is configured to slope from the inner edge of the second end surface 41bb toward the axial center of the shaft 34, as shown in FIGS. 3, 4 and 6.

The portion of the rotating member 41 surrounded by the first end surface 41ba and the first inner circumferential surface 41a preferably has a substantially trapezoidal cross-section. A conical dynamic pressure bearing unit is defined between the first end surface 41ba as a slanting surface and the lower surface 35a of each of the annular members 35 opposing the former.

As shown in FIGS. 3, 5 and 6, the seal member 44 preferably includes a wall portion 441, a cover portion 442 and a fixed portion 443.

The wall portion 441 opposes the outer circumferential surface 35b of the annular members 35 in a spaced-apart relationship. The side and top portions of the annular members 35 are covered by the wall portion 441 and the cover portion 442.

The cover portion 442 is a substantially annular portion having a shaft insertion hole defined at its central region. The cover portion 442 extends radially outwards from the upper end of the wall portion 441. The cover portion 442 has an inner circumferential surface 442a opposing the outer circumferential surface 34a of the shaft 34 in a spaced-apart relationship.

The seal member 44 may be attached to the lower surface of the body portion 411 of the rotating member 41 or both of the upper and lower surfaces of the body portion 411.

The gap between the outer circumferential surface 35b and the inner circumferential surface 44a gradually increases upwards. A lubricating fluid 5 is held in the gap by a capillary force, thereby forming a meniscus. A tapering seal portion forming a boundary surface of the lubricating fluid 5 is defined in the position where the surface tension of the lubricating fluid 5 and the atmospheric pressure are kept in equilibrium. In the tapering seal portion, the lubricating fluid 5 is pulled downwards.

In the event that the meniscus of the tapering seal portion is moved upwards by the volume expansion of the lubricating fluid 5 (attributable to, e.g., a centrifugal force or a temperature rise) or under other actions, the surface tension of the lubricating fluid 5 and the atmospheric pressure are kept in balance to thereby prevent the lubricating fluid 5 from being leaked out of the motor 1.

The annular member 35 and the seal member 44 arranged at the axial lower side have the same configuration as described above.

It is possible to use, e.g., oil mainly composed of ester such as polyol ester-based oil or diester-based oil as the lubricating fluid 5. The oil mainly composed of ester is superior in, e.g., wear resistance, thermal stability and flowability, and can be used as the lubricating fluid 5 of a fluid dynamic pressure bearing device.

Preferably, the fluid dynamic pressure bearing device includes at least the shaft 34, the annular members 35, the rotating member 41 and the seal member 44.

As can be seen in FIGS. 3, 5 and 6, the seal member 44 includes a lower surface portion 44b divided into a first end surface 44ba, a second end surface 44bb and a step surface 44bc. The step surface 44bc is positioned between the first end surface 44ba and the second end surface 44bb. The first end surface 44ba lies nearer to the end surface portion 41b of the rotating member 41 than the second end surface 44bb is.

If the seal member 44 is attached to the rotating member 41 as shown in FIG. 6, the first end surface 44ba makes contact with the third end surface 41bc of the rotating member 41 in the axial direction. The second end surface 44bb of the seal member 44 opposes the second end surface 41bb of the rotating member 41 in a spaced-apart relationship. The outer circumferential surface 44c of the seal member 44 makes contact with the second inner circumferential surface 41c of the rotating member 41 in the radial direction (see FIG. 3).

The step surface 44bc may have a sloping shape or an upright shape. No particular limitation is imposed on the shape of the step surface 44bc.

Referring again to FIGS. 3, 5 and 6, the second end surface 44bb of the seal member 44 is inclined relative to a plane perpendicular or substantially perpendicular to the central axis L. The radial outer end portion of the second end surface 44bb of the seal member 44 is positioned nearest to the second end surface 41bb of the rotating member 41, which the radial inner end portion of the second end surface 44bb (the radial innermost region of the lower surface portion 44b of the seal member 44) is positioned farthest from the second end surface 41bb of the rotating member 41.

In other words, the minute gap between the second end surface 44bb of the seal member 44 and the second end surface 41bb of the rotating member 41 gradually increases from the radial outer side toward the radial inner side. The width Y between the radial inner end of the second end surface 44bb and the second end surface 41bb is greater than the width X between the radial outer end of the second end surface 44bb and the second end surface 41bb (see FIG. 6).

This prevents the radial inner end of the second end surface 41bb from making contact with the second end surface 44bb even when an axially acting impact is applied to the radial inner end of the second end surface 41bb by external factors.

A conical dynamic pressure groove array 50 having a herringbone shape (see FIGS. 7A and 7B) is defined on the lower surface 35a of the annular members 35. The conical dynamic pressure groove array 50 and the first end surface 41ba of the rotating member 41 cooperate with each other to define a conical dynamic pressure bearing unit that supports radial and axial loads.

The conical dynamic pressure groove array 50 may be defined on the first end surface 41ba or on both the first end surface 41ba and the lower surface 35a.

Figure 7A:
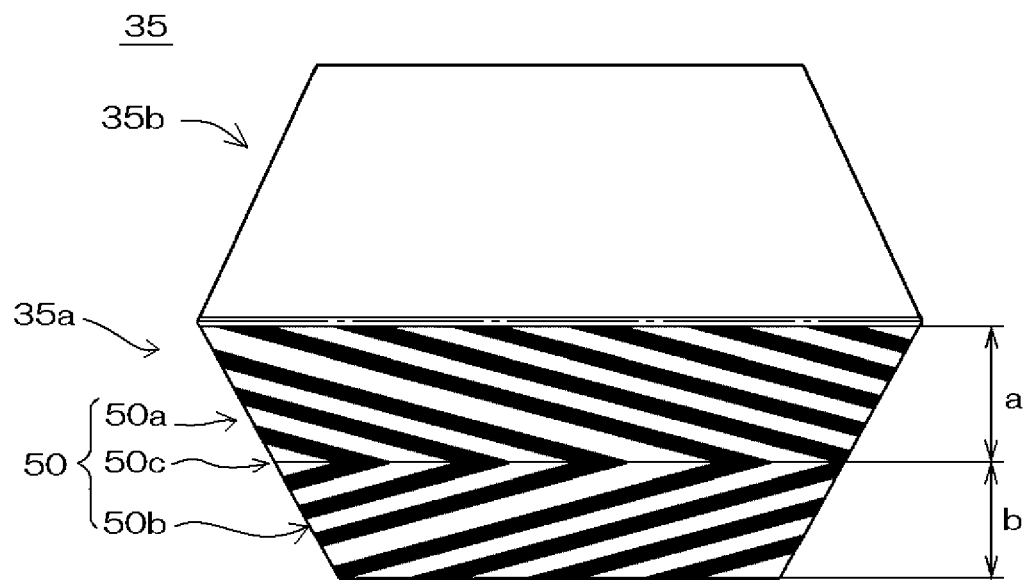
FIGS. 7A and 7B are views illustrating different kinds of conical dynamic pressure generating grooves in the annular member.
Figure 7B:
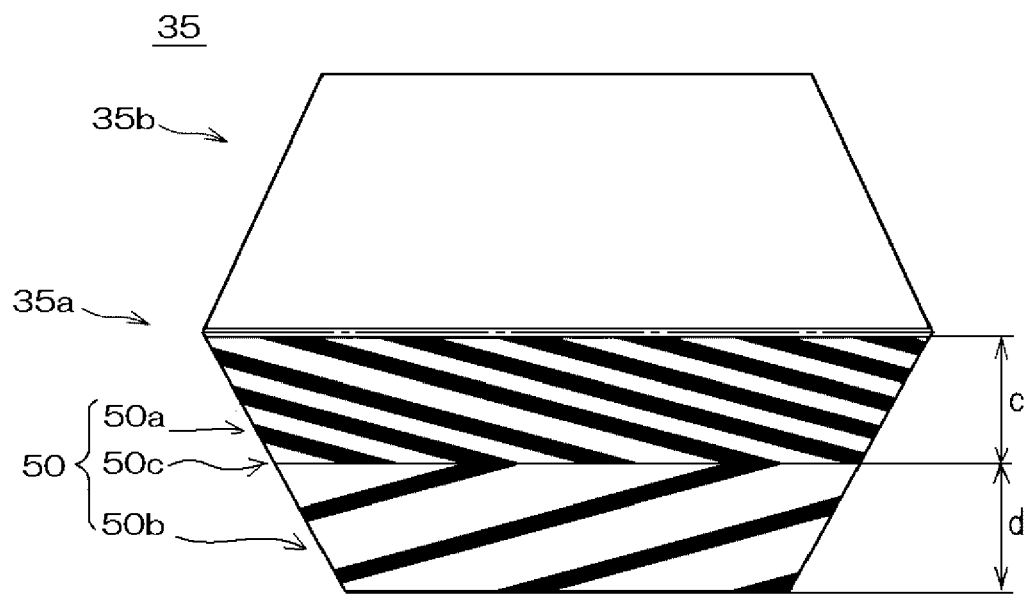

As shown in FIGS. 7A and 7B, the conical dynamic pressure groove array 50 includes first dynamic pressure generating grooves 50a and second dynamic pressure generating grooves 50b. The first dynamic pressure generating grooves 50a are arranged on the lower surface 35a in a spaced-apart relationship along the circumferential direction and are opposed to the second dynamic pressure generating grooves 50b. As the rotor unit 4 rotates, the conical dynamic pressure groove array 50 is capable of generating a fluid dynamic pressure in the lubricating fluid 5.

The lubricating fluid 5 pumped from the upper side toward the lower side by the first dynamic pressure generating grooves 50a and the lubricating fluid 5 pumped from the lower side toward the upper side by the second dynamic pressure generating grooves 50b impinge against each other in the boundary region 50c.

This results in local pressure increase in the vicinity of the boundary region 50c. Thus the rotating member 41 is radially and axially supported by the annular member 35 in a non-contact state. In other words, the rotating member 41 is rotatable relative to the annular member 35.

In case the number of the first dynamic pressure generating grooves 50a is the same as that of the second dynamic pressure generating grooves 50b as shown in FIG. 7A, it is preferred that the axial groove span a of the first dynamic pressure generating grooves 50a is set greater than the axial groove span b of the second dynamic pressure generating grooves 50b.

Alternatively, the number of the first dynamic pressure generating grooves 50a may be greater than that of the second dynamic pressure generating grooves 50b. In this case, the axial groove span c of the first dynamic pressure generating grooves 50a may be set equal to the axial groove span d of the second dynamic pressure generating grooves 50b as shown in FIG. 7B.

The conical dynamic pressure groove array 50 may have any shape or groove pattern insofar as it can work as a fluid dynamic pressure bearing. For example, the conical dynamic pressure groove array 50 may have a spiral shape or a tapering land shape.

Also, the annular member 35 arranged at the lower position of the rotating member 41 may be symmetrical to the aforementioned upper annular member 35 with respect to the axial center plane.

Figure 8:
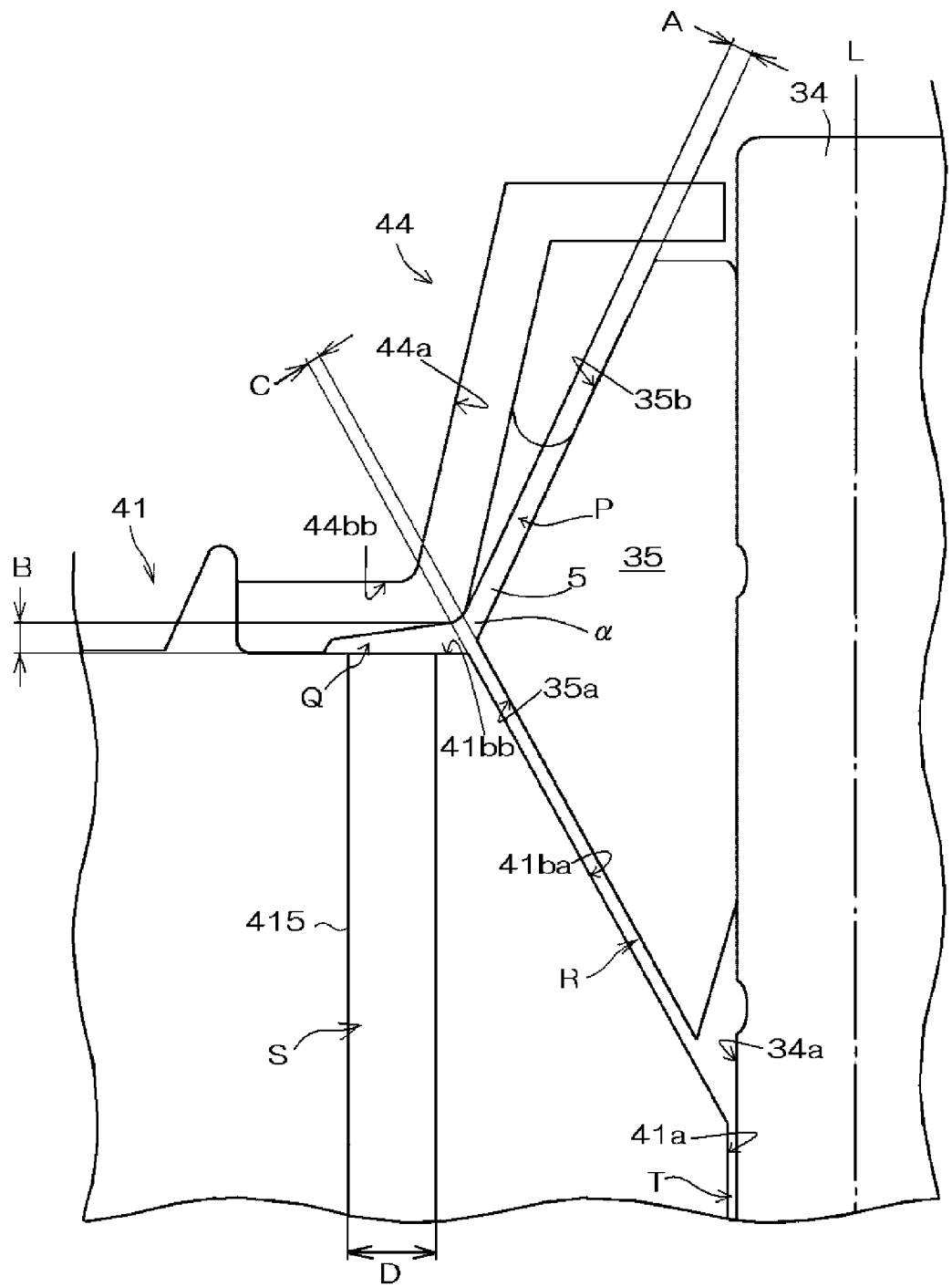
FIG. 8 is a view illustrating the size relationship between different minute gaps.

Referring to FIG. 8, a first minute gap P with a lower opening width A is defined between the outer circumferential surface 35b of the annular member 35 and the inner circumferential surface 44a of the seal member 44. The lower opening width A denotes the width between the radial outermost portion of the annular member 35 and the inner circumferential surface 44a of the seal member 44.

The first minute gap P preferably has a tapering shape. The lubricating fluid 5 is held within the first minute gap P, thereby defining a meniscus. In the position where the surface tension of the lubricating fluid 5 and the atmospheric pressure are kept in equilibrium, a boundary surface of the lubricating fluid 5 is defined.

A second minute gap Q with a width B is defined between the second end surfaces 44bb of the seal member 44 and the second end surfaces 41bb of the rotating member 41. In this regard, the width B refers to the width between the radial innermost region of the lower surface portion 44b (the second end surface 44bb in this preferred embodiment) and the end surface portion 41b (the second end surface 41bb in this preferred embodiment), i.e., the width of the radial inner opening of the second minute gap Q. In this preferred embodiment, the end surface of the seal member indicates the second end surface 44bb.

A third minute gap R with a width C is defined between the lower surface 35a of the annular member 35 and the first end surface 41ba of the rotating member 41.

The space within each of the communication holes 415 is defined as a fourth minute gap S with a width D.

A fifth minute gap T is defined between the outer circumferential surface 34a of the shaft 34 and the first inner circumferential surface 41a of the rotating member 41.

The first to fifth minute gaps P, Q, R, S and T provide mutually communicating spaces and hold the lubricating fluid 5 therein.

The second end surface 44bb of the seal member 44 opposes the opening 415a through the second minute gap Q. The lubricating fluid 5 axially flowing through each of the communication holes 415 passes the second minute gap Q and then flows into the third minute gap R.

The term "radial outermost portion of the annular member 35" used herein refers to the portion where the lower end of the outer circumferential surface 35b of the annular member 35 meets with the upper end of the lower surface 35a of the annular member 35.

In case when the second end surface 44bb is a slanting surface, the term "radial innermost portion of the second end surface 44bb of the seal member 44" refers to the radial inner end portion of the second end surface 44bb. As mentioned above, the second minute gap Q is gradually enlarged from the radial outer side toward the radial inner side. Thus the width B denotes the maximum width of the second minute gap Q (which is equivalent to the width Y in FIG. 6).

As can be seen in FIG. 8, the width B is preferably set smaller than the width D. The width A is set smaller than the width B but greater than the width C.

The width A is such that the tapering seal portion can serve as a fluid reservoir and the bubbles can go out through the first minute gap P.

Although no particular limitation is imposed on the size of the widths A, B, C and D, the width A may be, e.g., about 0.02 mm to about 0.2 mm. The width B may be, e.g., about 0.05 mm to about 0.5 mm. The width D may be, e.g., about 0.3 mm to about 1.2 mm. The width C of the third minute gap R may be, e.g., about 0.001 mm to about 0.005 mm if the dynamic pressure bearing unit has a conical structure.

By establishing the above relationship between the widths A, B, C and D, the lubricating fluid 5 is hardly leaked out from the motor 1 even when a strong impact is applied to the motor 1 from the outside.

Since the width A is greater than the width C as set forth above, the lubricating fluid 5 flowing out from the second minute gap Q flows toward the third minute gap R under the action of a capillary force at the branch point α (surrounded by the lower opening of the first minute gap P, the radial inner opening of the second minute gap Q and the radial outer opening of the third minute gap R).

Bubbles possibly contained in the lubricating fluid 5 pass the second minute gap Q and reach the branch point α together with the lubricating fluid 5. Owing to the fact that the width A is greater than the width C as set forth above, the bubbles flow toward the first minute gap P under the action of a capillary force.

In other words, the lubricating fluid 5 and the bubbles are separated from each other and are allowed to flow toward the third minute gap R and the first minute gap P, respectively.

Next, description will be made on a modified example of the first preferred embodiment. In the following description, the same components as those of the first preferred embodiment will be designated by like reference numerals with no detailed description made in that regard.

Figure 9:
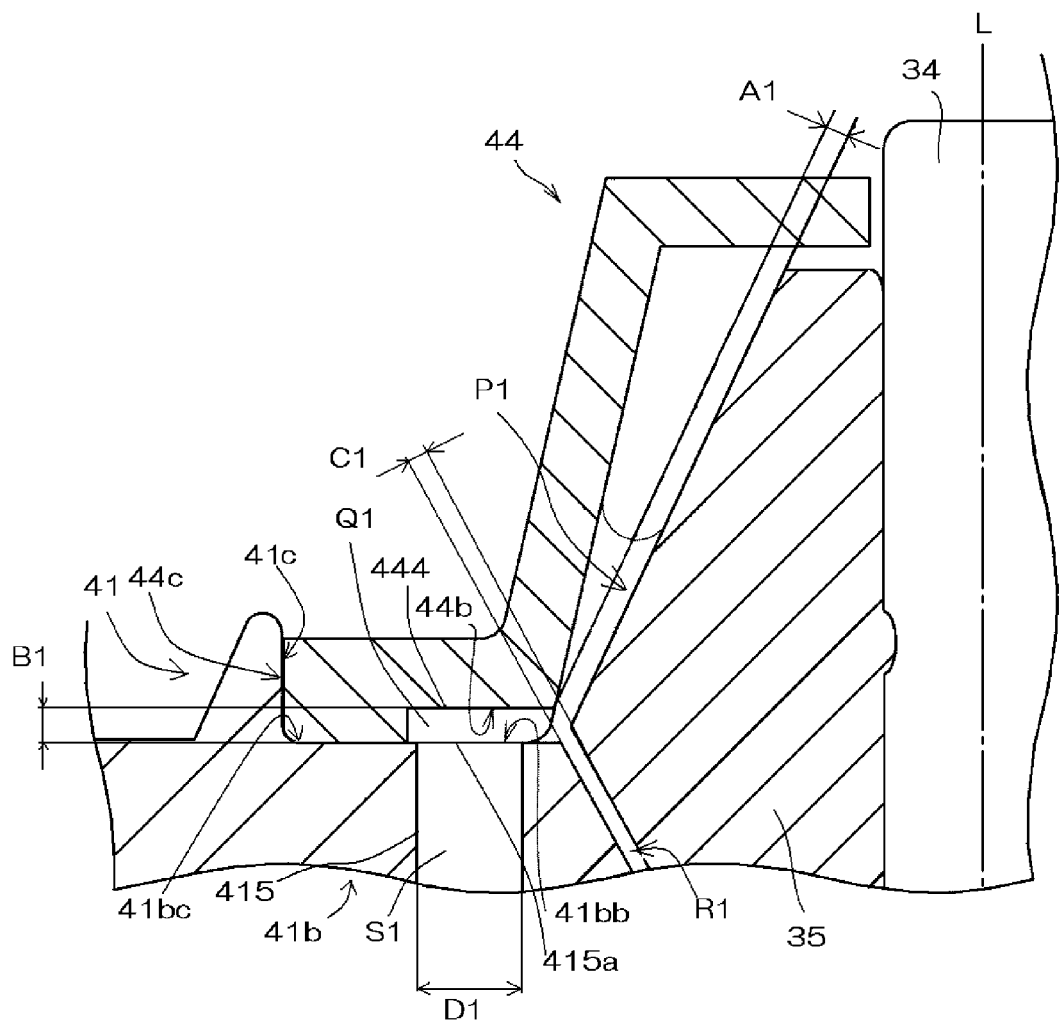
FIG. 9 is an enlarged section view illustrating the relationship between a rotating member and a seal member in accordance with a modified example of the first preferred embodiment.
Figure 10:
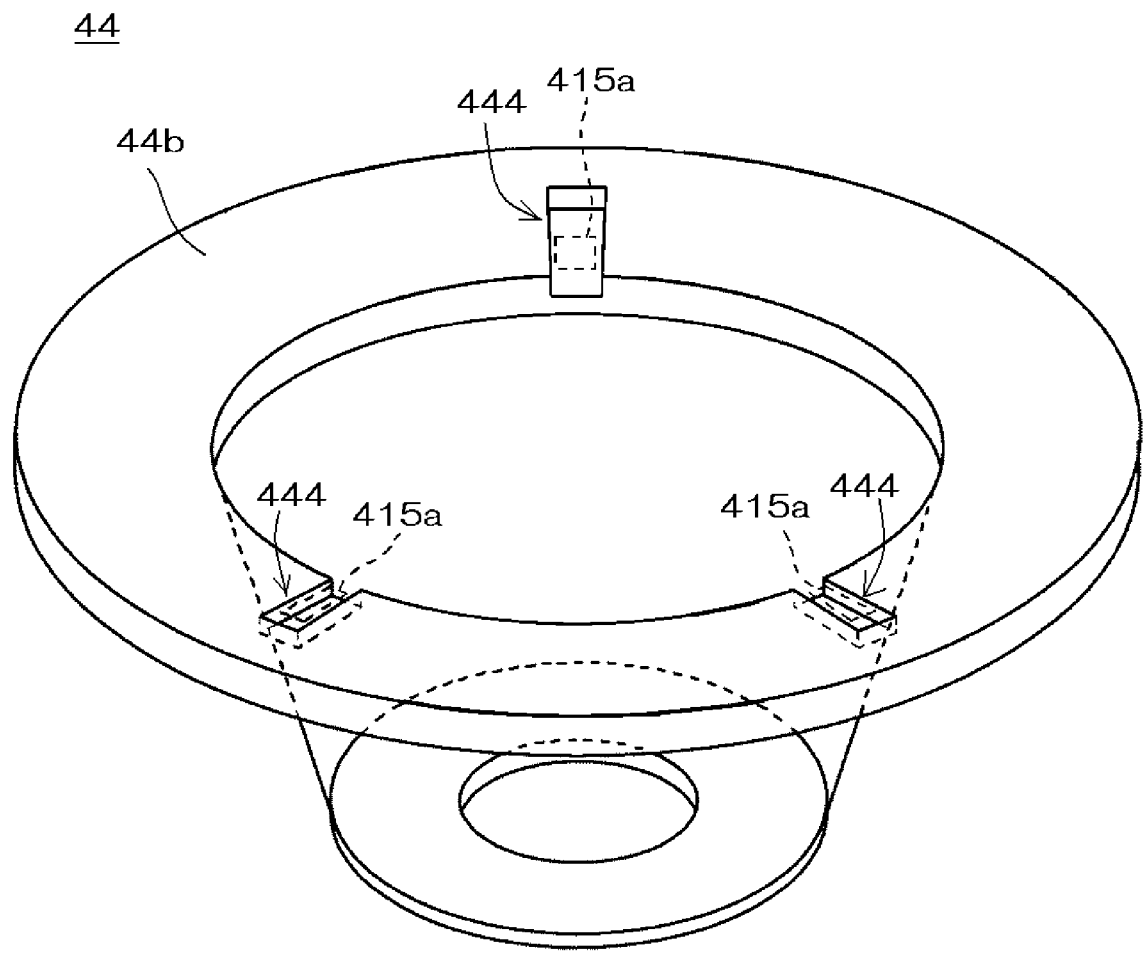
FIG. 10 is a rear perspective view showing the seal member in accordance with the modified example of the first preferred embodiment.

Referring to FIGS. 9 and 10, the lower surface portion 44b of the seal member 44 is parallel or substantially parallel to the end surface portion 41b of the rotating member 41 and has a plurality of radial grooves 444 communicating with the communication holes 415. Each of the radial grooves 444 has a width corresponding to the radial width of the second end surface 41bb of the rotating member 41.

In each of the radial grooves 444 shown in FIG. 10, the region corresponding to the position of the opening 415a is indicated by a broken line.

In this modified example, the number of the radial grooves 444 and the number of the communication holes 415 are three, respectively. However, the number of them is not particularly limited and may be, e.g., one. It is preferred that the number of the radial grooves 444 is equal to the number of the communication holes 415.

As in the first preferred embodiment, first to fifth minute gaps P1, Q1, R1, S1 and T1 (not shown in FIG. 9) are defined by the rotating member 41, the shaft 34, the annular member 35 and the seal member 44. The first to fourth gaps P1, Q1, R1 and S1 have widths A1, B1, C1 and D1, respectively.

The size relationship between the widths A1, B1, C1 and D1 is the same as described in connection with the first preferred embodiment. The width B1 is preferably smaller than the width D1. The width A1 is smaller than the width B1 but greater than the width C1.

Thus the lubricating fluid 5 flowing from each of the communication holes 415 passes the second minute gap Q1 and bubbles contained in the lubricating fluid 5 can flow toward the first minute gap P1 and the lubricating fluid 5 can flow the third minute gap R1. This provides the same effects as attained in the first preferred embodiment.

The radial width of each of the radial grooves 444 is not limited to the one described above. For example, each of the radial grooves 444 may be arranged to extend from the radial inner end of the lower surface portion 44b to the radial outer end thereof. In this case, each of the radial grooves 444 is opened at the radial outer end of the lower surface portion 44b (i.e., the outer circumferential surface 44c of the seal member 44). When the seal member 44 is fixed to the rotating member 41, the outer circumferential surface 44c comes into contact with the second inner circumferential surface 41c, thereby closing the opening of each of the radial grooves 444.

Next, description will be made on a second preferred embodiment.

Figure 11:
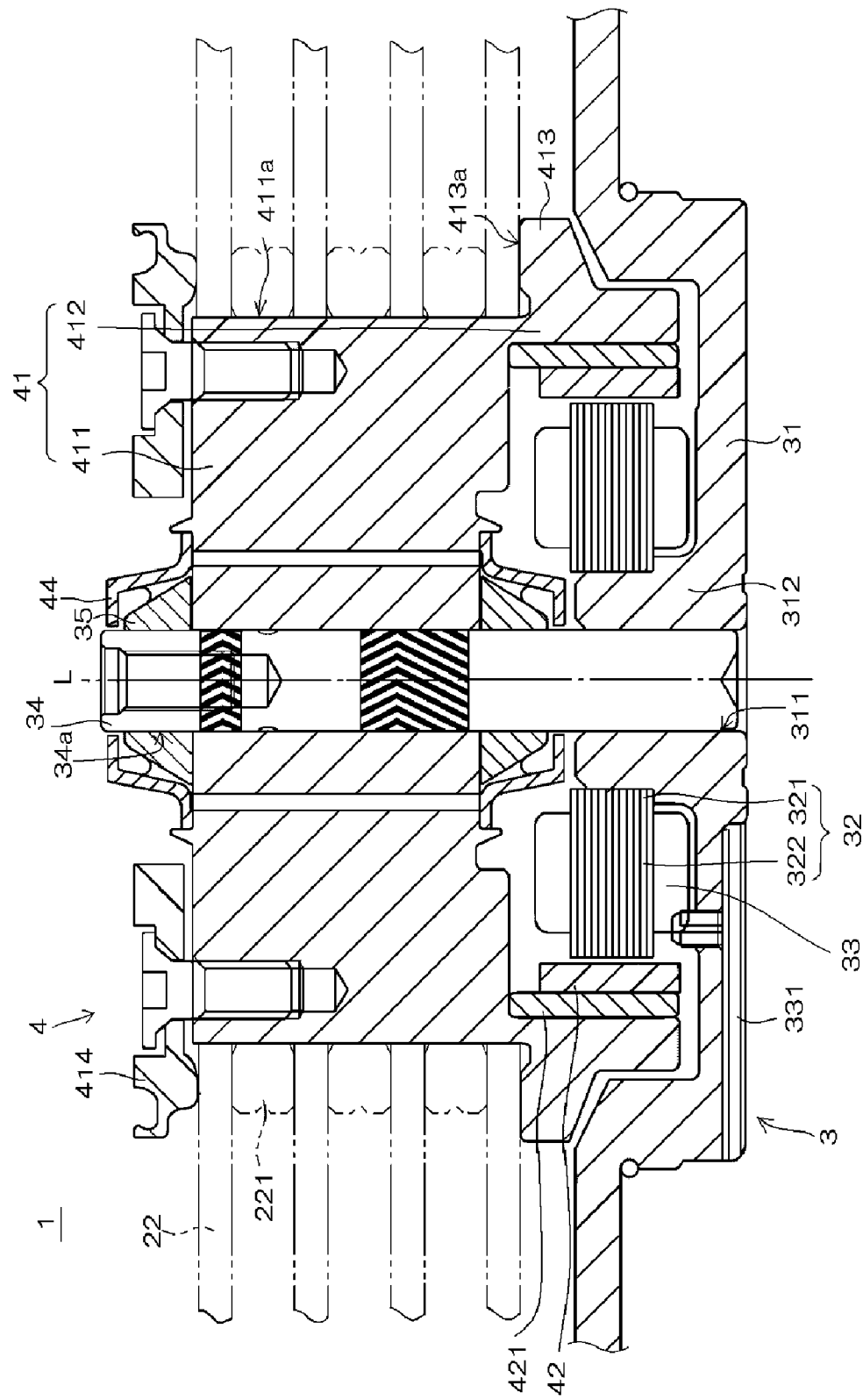
FIG. 11 is a vertical section view showing a spindle motor in accordance with a second preferred embodiment of present invention.
Figure 12:
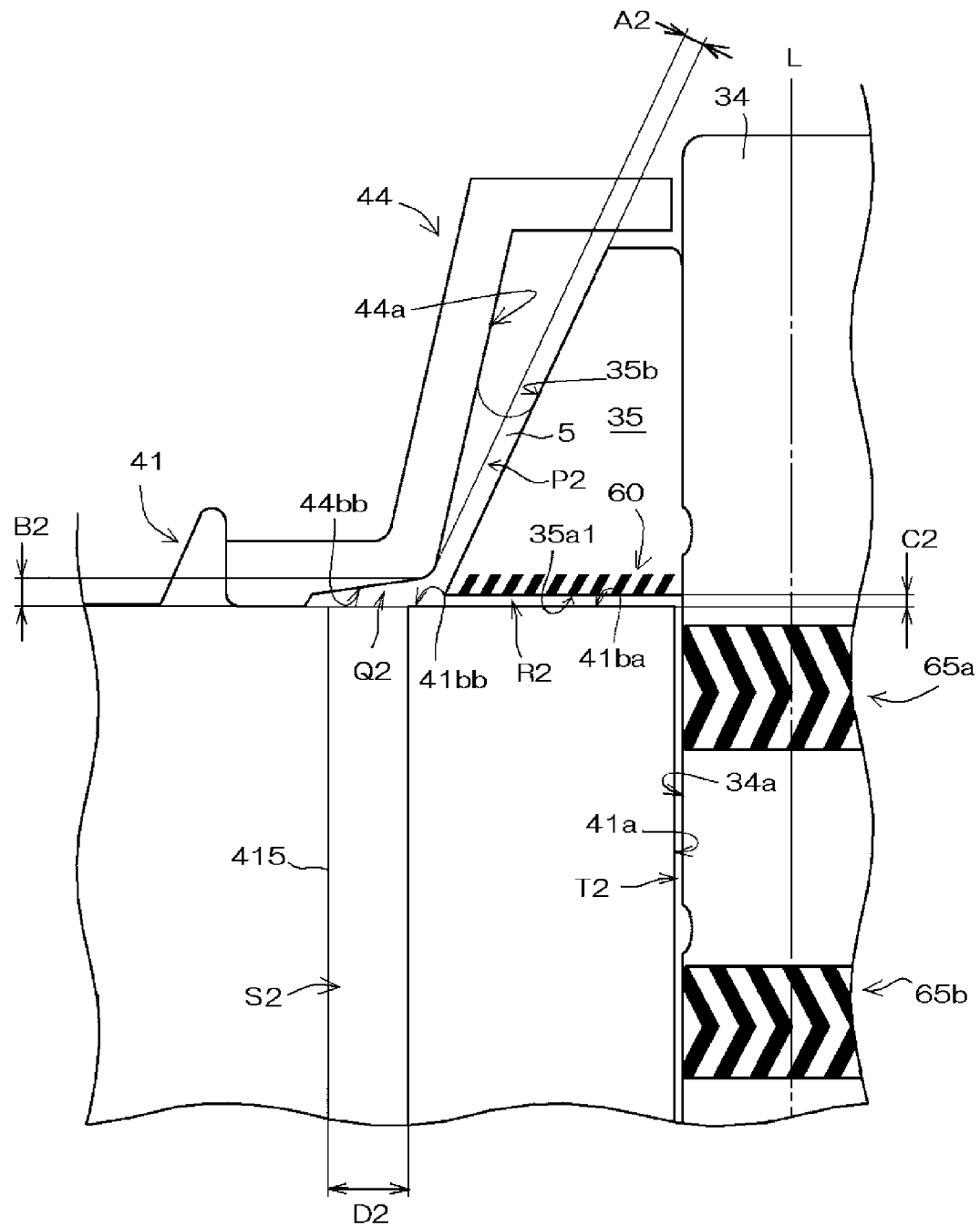
FIG. 12 is an enlarged section view illustrating the relationship between a rotating member and a seal member in accordance with the second preferred embodiment.
Figure 13:
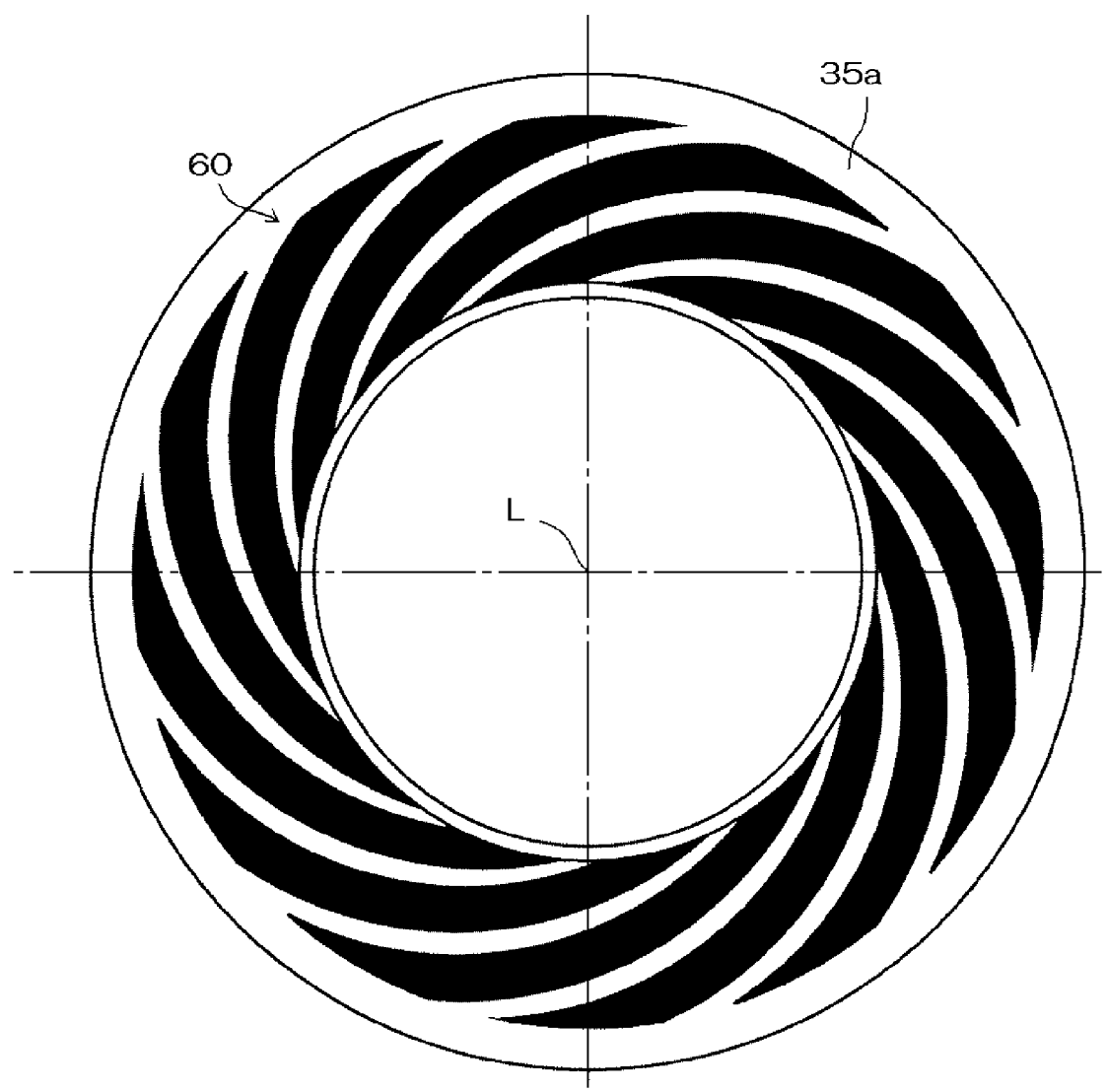
FIG. 13 is a bottom view showing an annular member in accordance with the second preferred embodiment.

Referring to FIGS. 11, 12 and 13, the dynamic pressure bearing unit has a thrust structure in the second preferred embodiment. The dynamic pressure bearing includes a thrust dynamic pressure bearing unit arranged to generate an axial bearing force and a radial dynamic pressure bearing unit arranged to generate a radial bearing force.

As shown in FIG. 12, a third minute gap R2 with a width C2 is defined between a lower surface 35a1 of the annular member 35 and a first end surface 41ba of the rotating member 41 and is filled with the lubricating fluid 5.

The thrust dynamic pressure bearing unit is provided in the third minute gap R2. A thrust dynamic pressure groove array 60 is defined on the lower surface 35a1.

As shown in FIG. 13, the thrust dynamic pressure groove array 60 has spiral grooves extending radially outwards away from the central axis L in a substantially radial direction.

When the rotating member 41 makes rotation relative to the annular member 35, a fluid dynamic pressure is generated in the lubricating fluid 5 filled in the third minute gap R2 by the pumping action of the thrust dynamic pressure groove array 60. Thus the rotating member 41 is axially rotatably supported by the annular member 35 in a non-contact state.

The shape of the thrust dynamic pressure groove array 60 is not particularly limited and may be, e.g., a herringbone shape or a tapering land shape.

The thrust dynamic pressure groove array 60 may be defined on the first end surface 41ba or on both the first end surface 41ba and the lower surface 35a1.

A fifth minute gap T2 is defined between the first inner circumferential surface 41a of the rotating member 41 and the outer circumferential surface 34a of the shaft 34 and is filled with the lubricating fluid 5. A radial dynamic pressure groove array 65 is defined on the outer circumferential surface 34a. Thus the radial dynamic pressure bearing unit arranged to support a radial load is provided in the fifth minute gap T2.

The radial dynamic pressure groove array 65 includes upper and lower herringbone-shaped radial dynamic pressure groove arrays 65a and 65b arranged in an axially spaced-apart relationship.

When the rotating member 41 makes rotation relative to the shaft 34, a fluid dynamic pressure is generated in the lubricating fluid 5 filled in the fifth minute gap T2 by the pumping action of the upper and lower groove arrays 65a and 65b. Thus the rotating member 41 is radially rotatably supported by the shaft 34 in a non-contact state.

The shape of the radial dynamic pressure groove array 65 is not particularly limited and may be, e.g., a spiral shape or a tapering land shape. The radial dynamic pressure groove array 65 may have any groove pattern insofar as it can work as a fluid dynamic pressure bearing.

The radial dynamic pressure groove array 65 may be defined on the first inner circumferential surface 41a of the rotating member 41 or on both the first inner circumferential surface 41a of the rotating member 41 and the outer circumferential surface 34a of the shaft 34.

In the second preferred embodiment, first to fifth minute gaps P2, Q2, R2, S2 and T2 are defined by the shaft 34, the annular member 35, the rotating member 41 and the seal member 44. The first to fourth minute gaps P2, Q2, R2 and S2 has widths A2, B2, C2 and D2, respectively.

The widths A2, B2, C2 and D2 have the same size relationship as that of the widths of the first to fourth minute gaps employed in the afore-mentioned preferred embodiments. Specifically, the width B2 is smaller than the width D2. The width A2 is smaller than the width B2 but greater than the width C2.

Accordingly, the second preferred embodiment is capable of providing the same effects as offered by the first preferred embodiment and the modified example thereof.

The width of the fifth minute gap T2 can be suitably set depending on the widths of the first to fourth minute gaps P2, Q2, R2 and S2, the shape of the rotating member 41 and so forth.

Next, description will be made on a modified example of the second preferred embodiment. Just like the second preferred embodiment, the modified example thereof has a thrust type dynamic pressure bearing structure.

Figure 14:
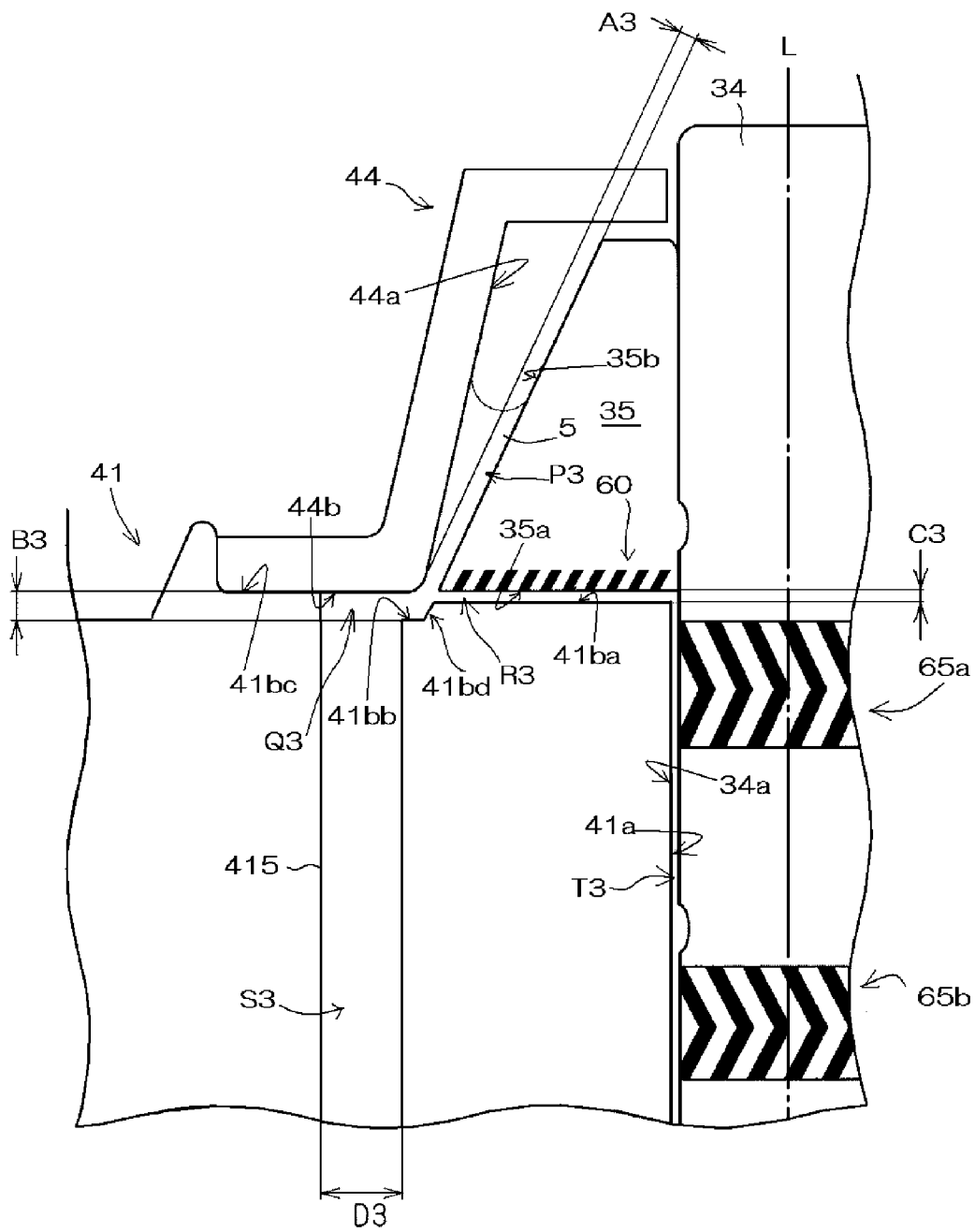
FIG. 14 is an enlarged section view illustrating the relationship between a rotating member and a seal member in accordance with a modified example of the second preferred embodiment.

Referring to FIG. 14, a step surface 41bd is defined between the first end surface 41ba and the second end surface 41bb. The second end surface 41bb is axially downwardly depressed as compared to the first end surface 41ba and the third end surface 41bc.

The third end surface 41bc of the rotating member 41 and the lower surface portion 44b of the seal member 44 make contact with each other. The second end surface 41bb and the lower surface portion 44b are opposed to each other through a second minute gap Q3.

As in the preferred embodiments described above, first to fifth minute gaps P3, Q3, R3, S3 and T3 which communicate with each other are defined by the shaft 34, the annular member 35, the rotating member 41 and the seal member 44. The first to fourth minute gaps P3, Q3, R3 and S3 have widths A3, B3, C3 and D3, respectively.

The widths A3, B3, C3 and D3 have the same size relationship as that of the preceding preferred embodiments. In other words, the width B3 is preferably smaller than the width D3. The width A3 is preferably smaller than the width B3 but greater than the width C3.

Accordingly, the modified example of the second preferred embodiment is capable of providing the same effects as offered by the preceding preferred embodiments.

The width of the fifth minute gap T3 can be suitably set depending on the widths of the first to fourth minute gaps P3, Q3, R3 and S3 and the shape of the rotating member 41.

Next, description will be made on another modified example of the second preferred embodiment. In this modified example, the dynamic pressure bearing unit has a thrust structure. The third end surface 41bc of the rotating member 41 employed in the preceding preferred embodiments may be either provided or omitted in this modified example. The following description is directed to a case where the third end surface 41bc is absent.

Figure 15:
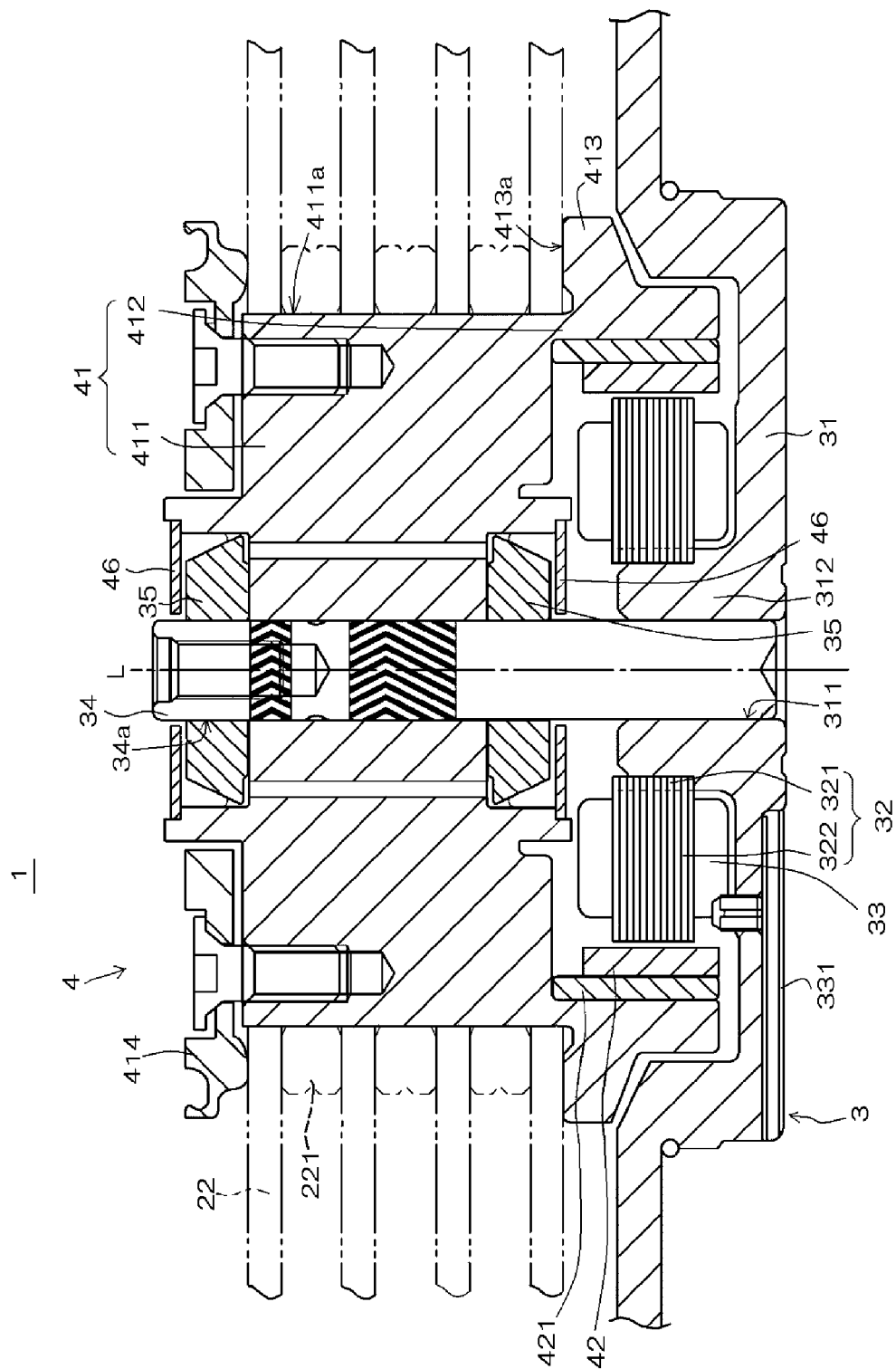
FIG. 15 is a vertical section view showing a spindle motor in accordance with another modified example of the second preferred embodiment.
Figure 16:
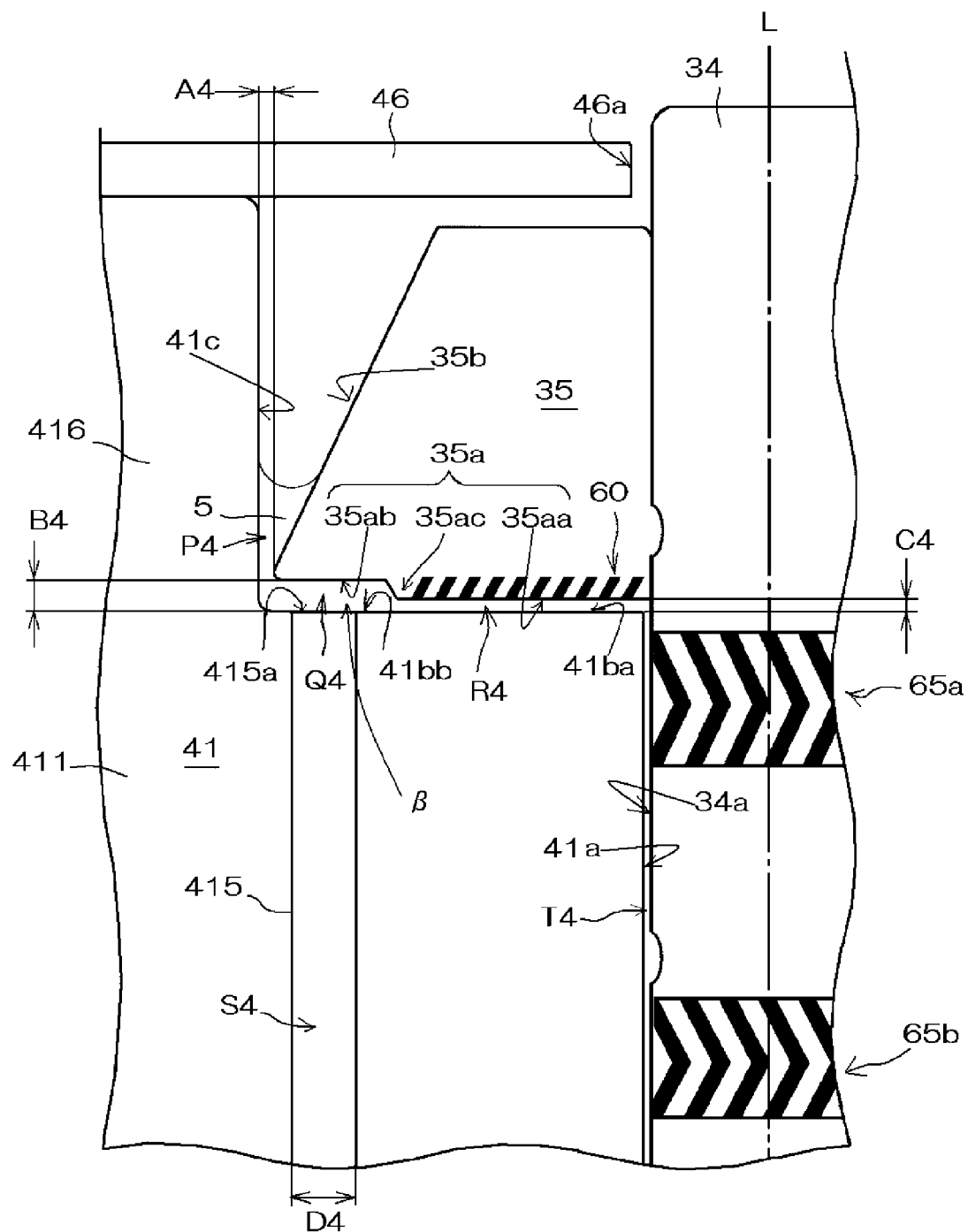
FIG. 16 is an enlarged section view illustrating the relationship between a rotating member and a seal member in accordance with the another modified example shown of the second preferred embodiment in FIG. 15.

Referring to FIGS. 15 and 16, caps 46 arranged to cover the upper and lower sides of the annular members 35 are attached to the rotating member 41 by welding, bonding or the like, for example. The caps 46 are used, e.g., to prevent the lubricating fluid 5 from being leaked out from the motor 1.

Each of the caps 46 is preferably a substantially annular member having a shaft insertion hole defined in the central region thereof. Each of the caps 46 has an inner circumferential surface 46a opposing the outer circumferential surface 34a of the shaft 34 in a spaced-apart relationship.

Alternatively, a single cap 46 may be provided on one of the upper and lower sides of the annular members 35.

As can be seen in FIG. 16, the lower surface 35a of the annular member 35 has a first end surface 35aa, a second end surface 35ab and a step surface 35ac arranged between the first and second end surfaces 35aa and 35ab. The first end surface 35aa is positioned nearer to the end surface portion 41b of the rotating member 41 than the second end surface 35ab.

A third minute gap R4 with a width C4, which defines a thrust dynamic bearing unit, is defined between the first end surface 35aa of the annular member 35 and the first end surface 41ba of the rotating member 41.

The second end surface 35ab of the annular member 35 opposes the second end surface 41bb of the rotating member 41 through a second minute gap Q4 with a width B4.

The second minute gap Q4 communicates with the third minute gap R4. Thus the lubricating fluid 5 axially flowing through each of the communication holes 415 can flow toward the third minute gap R4 via the second minute gap Q4.

The step surface 35ac of the annular member 35 may have a sloping shape or an upright shape. However, no particular limitation is imposed on the shape of the step surface 35ac of the annular member 35.

As shown in FIG. 16, a first minute gap P4 with a width A4 is defined between the outer circumferential surface 35b of the annular member 35 and the second inner circumferential surface 41c of the rotating member 41. The width A4 refers to the width between the radial outermost portion of the annular member 35 in a cross-section containing the central axis L and the second inner circumferential surface 41c of the rotating member 41 (i.e., the width of a lower opening of the first minute gap P4).

Referring again to FIG. 16, the first minute gap P4 defined between the outer circumferential surface 35b and the second inner circumferential surface 41c grows wider from the lower side toward the upper side. The lubricating fluid 5 is held in the first minute gap P4 by a capillary force, while forming a meniscus. In the position where the surface tension of the lubricating fluid 5 and the atmospheric pressure are kept in equilibrium, a tapering seal portion defining a boundary surface of the lubricating fluid 5 is arranged.

Even if the lubricating fluid 5 is moved upwards by an external impact, it is pulled downwards again. This makes it possible to prevent the lubricating fluid 5 from being leaked upwards. As a result, the lubricating fluid 5 is prevented from being leaked out from the motor 1.

In the event that the meniscus of the tapering seal portion is moved upwards by the volume expansion of the lubricating fluid 5 (attributable to, e.g., a centrifugal force or a temperature rise) or under other actions, the surface tension of the lubricating fluid 5 and the atmospheric pressure are kept in balance to thereby prevent the lubricating fluid 5 from being leaked out of the motor 1.

The same structures as described above can be employed in the annular member 35 and the cap 46 which are positioned on the axial lower side.

The width B4 is preferably smaller than the width D4. The width A4 is preferably smaller than the width B4 but greater than the width C4. The width A4 is great enough to ensure that the bubbles can go out through the first minute gap P4 and the tapering seal portion can serve as a fluid reservoir.

The lubricating fluid 5 flowing out from the second minute gap Q4 reaches the branch point β (surrounded by the lower opening of the first minute gap P4, the radial inner opening of the second minute gap Q4 and the radial outer opening of the third minute gap R4).

Since the width C4 is smaller than the width A4 as set forth above, the lubricating fluid 5 flows into the third minute gap R4 under the action of a capillary force.

The bubbles contained in the lubricating fluid 5 flow into the second minute gap Q4 and reach the branch point β. Since the width A4 is greater than the width C4, the bubbles flow toward the first minute gap P4 under the action of a capillary force.

In other words, the lubricating fluid 5 and the bubbles are separated from each other and are allowed to flow toward the third minute gap R4 and the first minute gap P4, respectively.

There are also defined fourth and fifth minute gaps S4 and T4 which have substantially the same structures as those of the fourth and fifth minute gaps employed in the preceding preferred embodiments. The widths of the fourth and fifth minute gaps S4 and T4 can be suitably set depending on the size of the first to third minute gaps P4, Q4 and R4.

The structures described above can be applied to other dynamic bearing structures, e.g., conical dynamic bearing units, if they are configured to arbitrarily set the size relationship between the widths A4, B4, C4 and D4.

Next, description will be made on still another modified example of the second preferred embodiment. In this modified example, the dynamic pressure bearing unit has a thrust structure as in the aforementioned modified examples of the second preferred embodiment.

Figure 17:
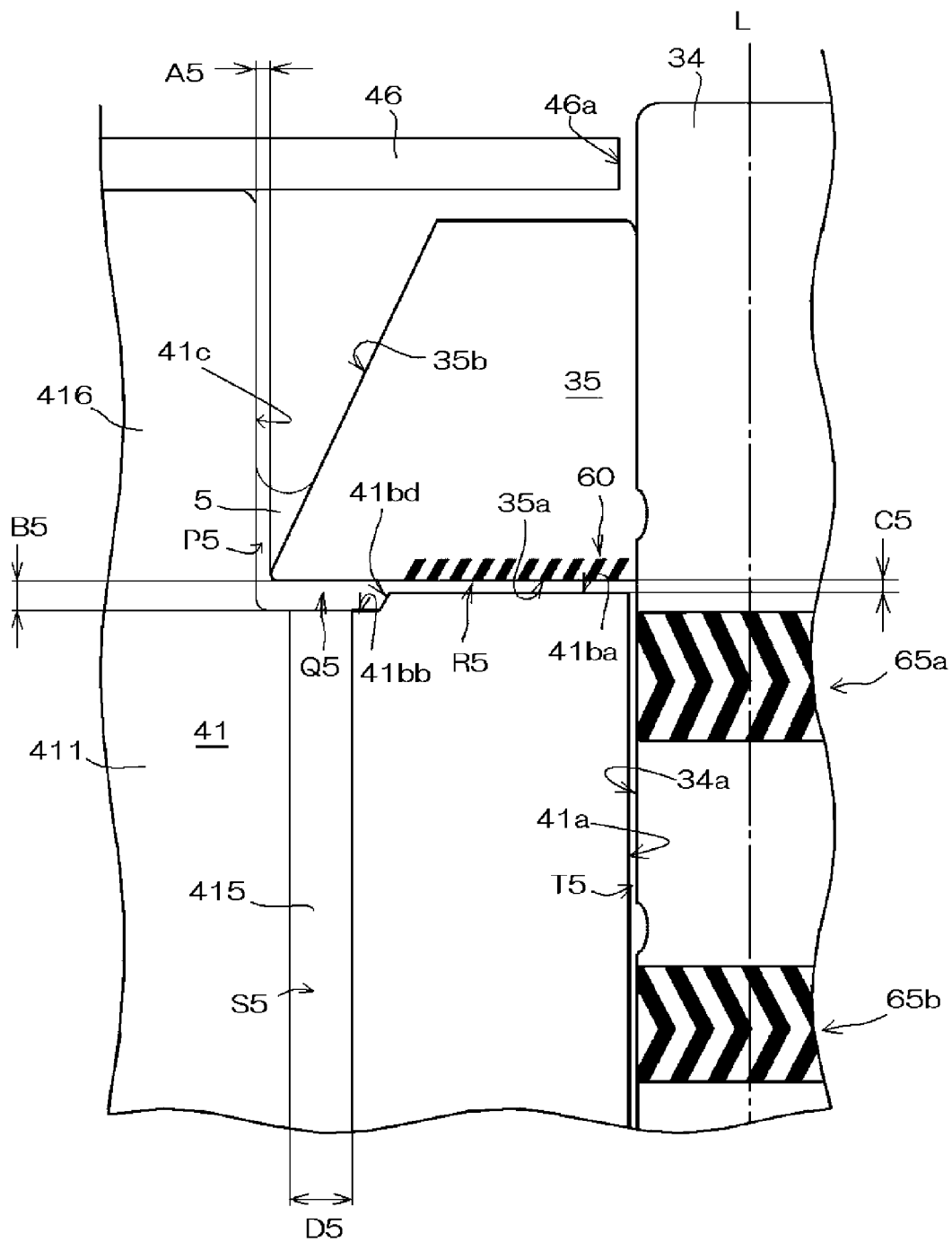
FIG. 17 is an enlarged section view illustrating the relationship between a rotating member and a seal member in accordance with still another modified example of the second preferred embodiment.

Referring to FIG. 17, the body portion 411 of the rotating member 41 has a first end surface 41ba, a second end surface 41bb and a step surface 41bd defined between the first and second end surfaces 41ba and 41bb. The second end surface 41bb is arranged farther from the lower surface 35a than the first end surface 41ba is.

As in the second preferred embodiment, first to fifth minute gaps P5, Q5, R5, S5 and T5 are defined by the shaft 34, the annular member 35, the rotating member 41 and the cap 46. The first to fourth minute gaps P5, Q5, R5 and S5 have widths A5, B5, C5 and D5, respectively.

The widths A5, B5, C5 and D5 have the same size relationship as that of the second preferred embodiment. In other words, the width A5 is preferably smaller than the width B5 but greater than the width C5. The width B5 is preferably smaller than the width D5.

With this configuration, it is possible to provide the same effects as offered by the second preferred embodiment.

The width of the fifth minute gap T5 can be suitably set depending on the widths of the first to fourth minute gaps P5, Q5, R5 and S5, the shape of the rotating member 41 and so forth.

In the aforementioned preferred embodiments, the protrusion 416 may be omitted and the lower surface portion 44b of the seal member 44 may be axially brought into contact with and fixed to the end surface portion 41b of the rotating member 41. In this case, it is preferable to provide a member arranged to fix the outer circumferential surface 44c of the seal member 44 in place.

Figure 18:
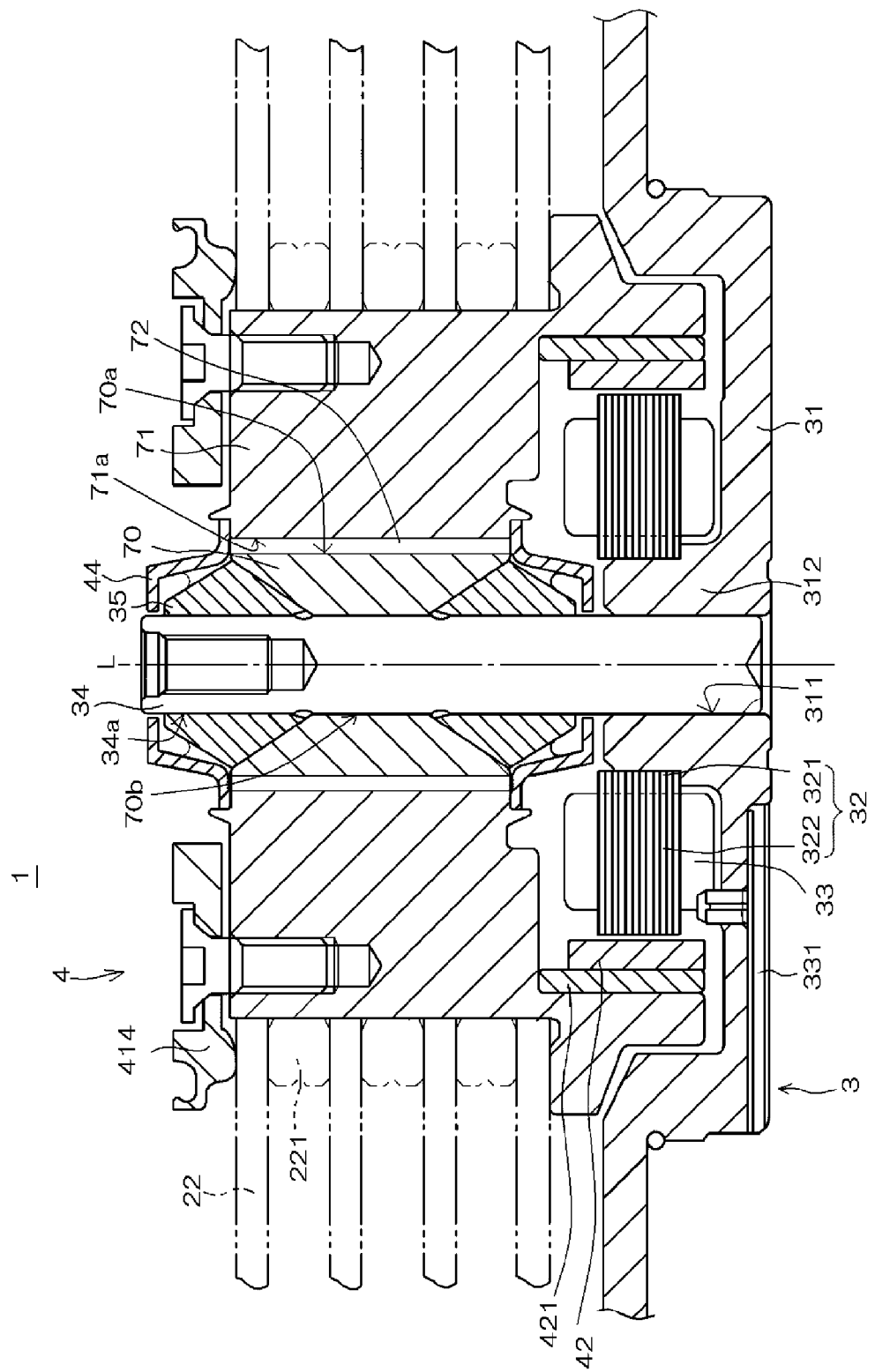
FIG. 18 is a vertical section view showing a spindle motor whose rotating member includes a sleeve and a hub.

Referring to FIG. 18, the rotating member 41 may be configured to have a sleeve 70 and a hub 71. The sleeve 70 is a substantially cylindrical member arranged on the outer circumference side of the shaft 34. The sleeve 70 is arranged so that the end surface thereof can oppose the lower surface 35a of the annular member 35. The sleeve 70 has an inner circumferential surface 70b opposing the outer circumferential surface 34a of the shaft 34 and rotatably supporting the shaft 34 and the annular members 35.

The hub 71 is shaped to extend radially outwards away from the central axis L and is fixed to or seamlessly defined with the sleeve 70 for rotation with the latter.

On the outer circumferential surface 70a of the sleeve 70, there is formed one or more axial grooves 72 axially extending from the upper end surface to the lower end surface of the sleeve 70. Each of the axial grooves 72 cooperates with the inner circumferential surface 71a of the hub 71 to define an axially-extending communication hole.

Regions corresponding to the first end surface 41ba, the second end surface 41bb and the third end surface 41bc of the first preferred embodiment can be suitably defined on the end surface portions of the sleeve 70 and the hub 71.

Figure 19:
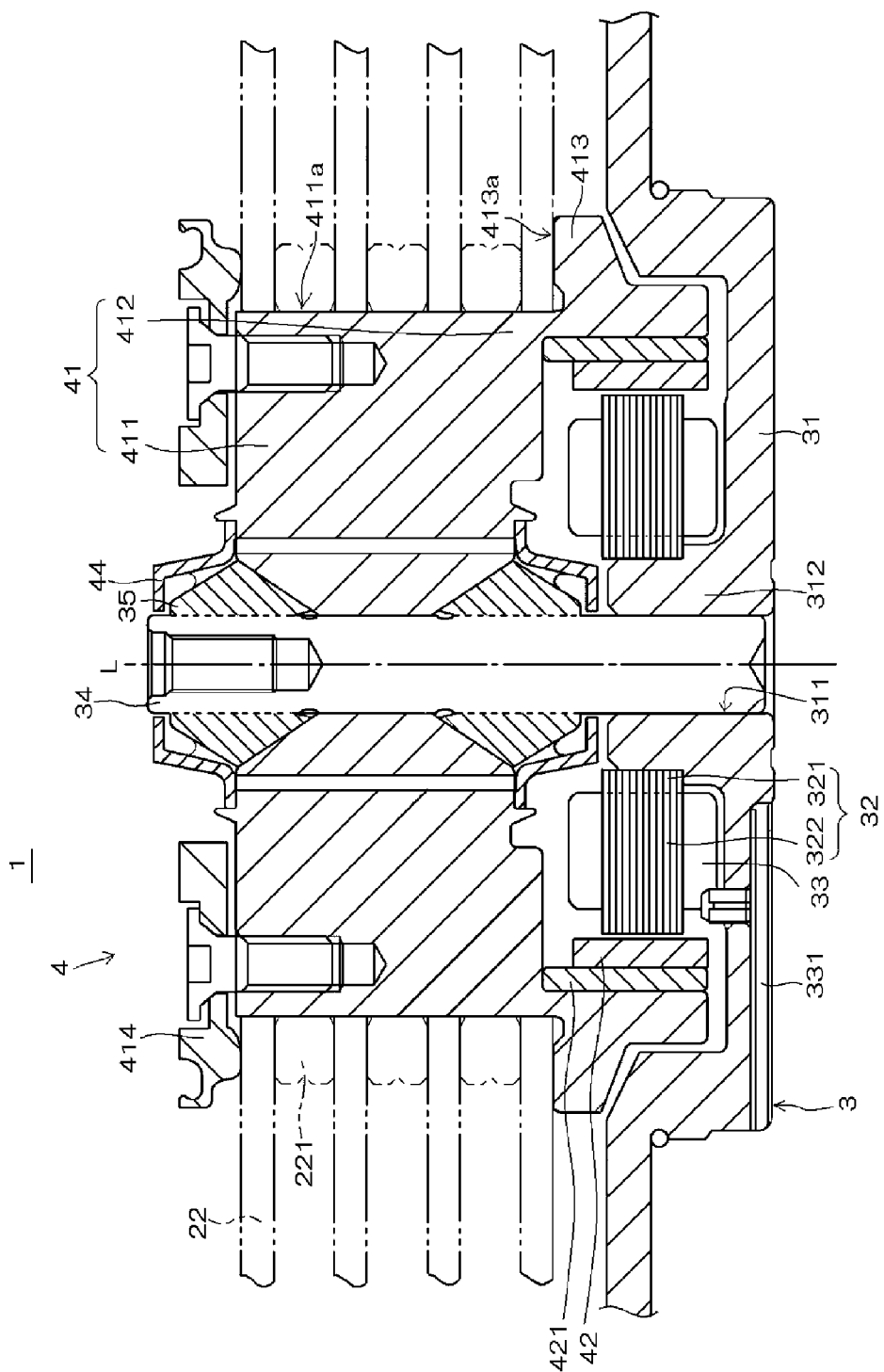
FIG. 19 is a vertical section view showing a spindle motor in which a shaft and an annular member are seamlessly formed into a single piece.

In the preferred embodiments and the modified examples thereof described above, the annular member 35 and the shaft 34 may be defined by a single member as shown in FIG. 19. In this case, other configurations than the annular member 35 and the shaft 34 can be the same as employed in the preceding preferred embodiments and the modified examples thereof.

The preferred embodiments described above can be applied to shaft-fixed outer rotor type spindle motors, shaft-rotating motors and inner rotor type spindle motors.

Some of the shaft-rotating motors have a configuration in which a sleeve housing is interposed between the sleeve 70 and the hub 71. In this case, the sleeve, the hub and the sleeve housing may be defined by a single member or may be produced independently of one another and then fixed together or formed into a single member.

The structures employed in the foregoing preferred embodiments can be applied to the configuration of the rotating member and the annular member positioned on the axial lower side as well as those arranged on the axial upper side.

Figure 20:
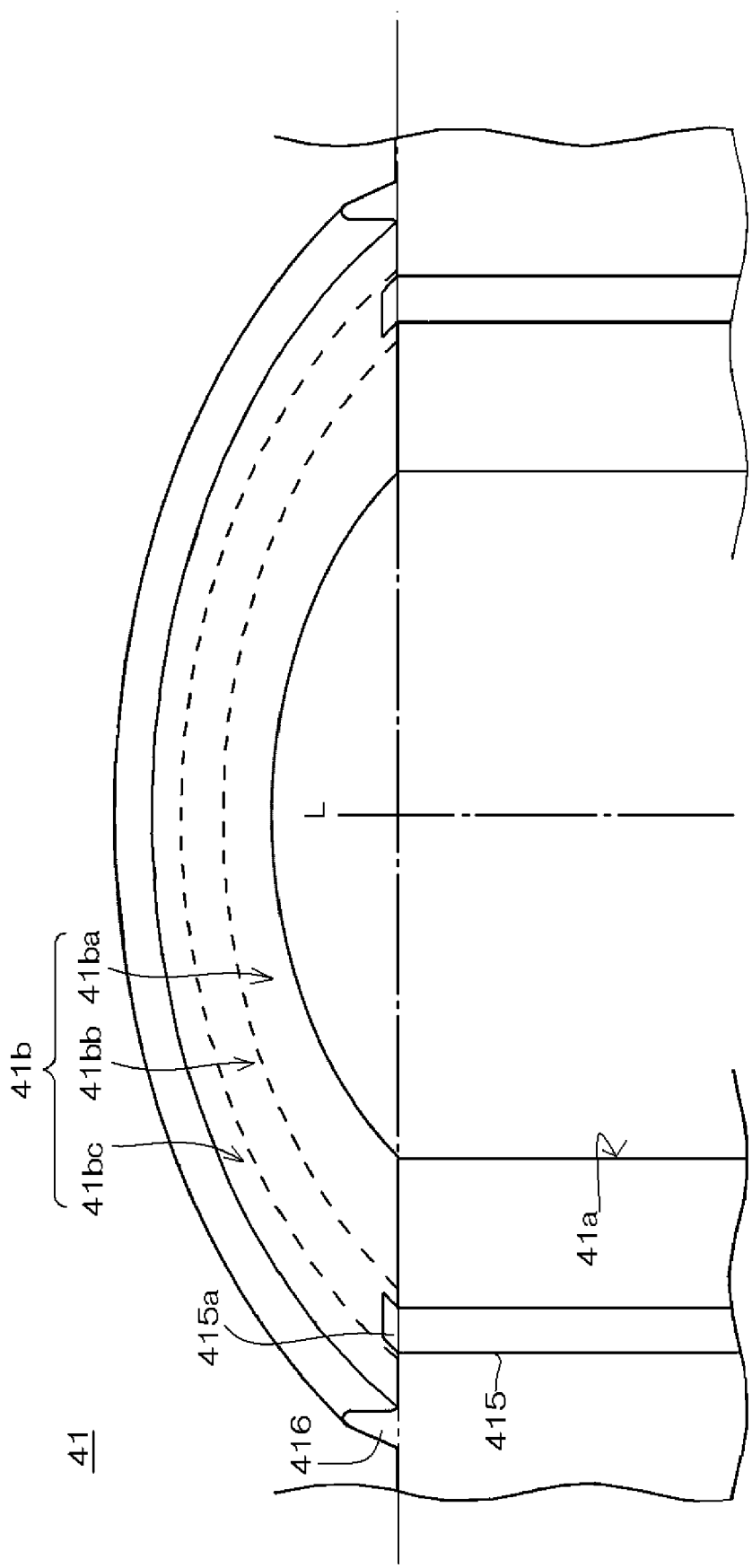
FIG. 20 is a view showing a modified example of the rotating member shown in FIG. 4 (a modified example of the thrust dynamic pressure bearing unit).

In case the dynamic pressure bearing unit has a thrust structure, the rotating member 41 can have the shape illustrated in FIG. 20. The rotating member 41 having this shape may be applied to the conical dynamic bearing described above. In this case, the widths A, B, C and D can have the same size as set forth above. For example, the width C can be set equal to about 0.010 mm to about 0.020 mm.

While the invention has been shown and described with respect to the preferred embodiments, it will be understood by those skilled in the art that various changes and modification may be made without departing from the scope of the invention as defined in the following claims.

What is claimed is:

1. A fluid dynamic pressure bearing device comprising:
   a rotating member including a through-hole substantially coaxial with a central axis;
   a shaft located in the through-hole of the rotating member, the shaft including an outer circumferential surface;
   an annular member arranged to extend radially outwards away from the outer circumferential surface of the shaft, the annular member being arranged in an opposing relationship with the rotating member, the annular member including an outer circumferential surface; and
   a seal member including an inner circumferential surface radially opposed to the annular member and an axial end surface portion axially opposed to the rotating member; wherein
   a first gap is arranged between the inner circumferential surface of the seal member and a radially outermost surface of the annular member;
   a second gap communicating with the first gap is arranged between the axial end surface portion of the seal member and the rotating member;
   a third gap communicating with the second gap is arranged axially between the annular member and the rotating member;
   a lubricating fluid is continuously arranged in the first gap, the second gap, and the third gap; and
   a width of the first gap between the inner circumferential surface of the seal member and a radial outermost portion of the outer circumferential surface of the annular member is smaller than a width of the second gap between a radial inner end of the axial end surface portion of the seal member and the rotating member but greater than a width of the third gap.

2. The fluid dynamic pressure bearing device of claim 1, wherein the first gap has a tapering shape, and the lubricating fluid includes a boundary surface located within the first gap.

3. The fluid dynamic pressure bearing device of claim 1, wherein the second gap has a tapering shape, and the second gap has a radial inner width and a radial outer width, the radial inner width being greater than the radial outer width.

4. The fluid dynamic pressure bearing device of claim 1, wherein the second gap has a substantially uniform axial width.

5. The fluid dynamic pressure bearing device of claim 1, further comprising a conical bearing unit provided in the third gap.

6. The fluid dynamic pressure bearing device of claim 1, wherein the rotating member includes a communication hole communicating with the second gap, the width of the second gap being smaller than a width of the communication hole.

7. The fluid dynamic pressure bearing device of claim 1, wherein
   a fourth gap is arranged between the outer circumferential surface of the shaft and the rotating member in a position below the third gap; and
   the lubricating fluid is continuously arranged in the first gap, the second gap, the third gap, and the fourth gap.

8. The fluid dynamic pressure bearing device of claim 1, wherein a step surface opposing the second gap is provided in one of the rotating member, the annular member, and the seal member.

9. The fluid dynamic pressure bearing device of claim 8, wherein the axial end surface portion of the seal member includes a first axial end surface contacting the rotating member and a second axial end surface, the step surface being provided in the seal member to interconnect the first axial end surface and the second axial end surface.

10. A spindle motor comprising:
    the fluid dynamic pressure bearing device of claim 1;
    a base member to which a stator is mounted, the shaft being fixed to the base member; and
    a rotor magnet attached to the rotating member in an opposing relationship with the stator.

11. A disk drive apparatus comprising:
    a housing;
    the spindle motor of claim 10 fixed within the housing, the spindle motor arranged to rotate a disk in the disk drive apparatus; and
    an access unit arranged to read and/or write information from and/or on the disk.

12. A fluid dynamic pressure bearing device comprising:
    a rotating member including a through-hole substantially coaxial with a central axis, the rotating member including first and second inner circumferential surfaces;
    a shaft located in the through-hole of the rotating member, the shaft including an outer circumferential surface; and
    an annular member arranged to extend radially outwards away from the outer circumferential surface of the shaft, the annular member including an axial end surface positioned in an opposing relationship with the rotating member and a radially outermost circumferential surface; wherein
    a first gap is arranged between the radially outermost circumferential surface of the annular member and the second inner circumferential surface of the rotating member opposing the outer circumferential surface of the annular member;
    second and third gaps communicating with the first gap are arranged between the axial end surface of the annular member and the rotating member;
    a lubricating fluid is continuously arranged in the first gap, the second gap, and the third gap;
    a width of the first gap between a radial outermost portion of the outer circumferential surface of the annular member and the second inner circumferential surface of the rotating member is smaller than a width of the second gap but greater than a width of the third gap; and
    the second gap is positioned radially between the first gap and the third gap.

13. The fluid dynamic pressure bearing device of claim 12, wherein the first gap has a tapering shape, and the lubricating fluid includes a boundary surface located within the first gap.

14. The fluid dynamic pressure bearing device of claim 12, further comprising a thrust bearing unit provided in the third gap.

15. The fluid dynamic pressure bearing device of claim 12, wherein the rotating member includes a communication hole communicating with the second gap, the width of the second gap being smaller than a width of the communication hole.

16. The fluid dynamic pressure bearing device of claim 12, wherein the annular member includes a first end surface arranged to define the third gap, a second end surface arranged to define the second gap, and a step surface arranged to oppose the second gap, the step surface being positioned radially outwards of the first end surface and radially inwards of the second end surface.

17. The fluid dynamic pressure bearing device of claim 12, wherein the rotating member has a first axial end surface arranged to define the third gap, a second axial end surface arranged to define the second gap, and a step surface arranged to oppose the second gap, the step surface being positioned radially outwards from the first end surface and radially inwards from the second end surface.

18. The fluid dynamic pressure bearing device of claim 12, wherein a fourth gap is arranged between the outer circumferential surface of the shaft and the first inner circumferential surface of the rotating member opposing the outer circumferential surface of the shaft, and a radial bearing unit is provided in the fourth gap.

19. A spindle motor comprising:
the fluid dynamic pressure bearing device of claim 12;
a base member to which a stator is mounted, the shaft being fixed to the base member; and
a rotor magnet attached to the rotating member in an opposing relationship with the stator.

20. A disk drive apparatus comprising:
a housing;
the spindle motor of claim 19 fixed within the housing, the spindle motor arranged to rotate a disk in the disk drive apparatus; and
an access unit arranged to read and/or write information from and/or on the disk.

* * * * *